US007142560B2

(12) United States Patent
Mansfield

(10) Patent No.: US 7,142,560 B2
(45) Date of Patent: Nov. 28, 2006

(54) SYSTEM AND METHOD FOR VIRTUAL MULTILINE TELEPHONY IN A HOME-NETWORK TELEPHONE

(75) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 965 days.

(21) Appl. No.: 10/140,402

(22) Filed: May 6, 2002

(65) Prior Publication Data

US 2003/0035523 A1 Feb. 20, 2003

Related U.S. Application Data

(60) Provisional application No. 60/312,365, filed on Aug. 14, 2001.

(51) Int. Cl.
*H04J 3/16* (2006.01)
(52) U.S. Cl. .................. 370/466; 370/401; 370/352
(58) Field of Classification Search .................. None
See application file for complete search history.

(56) References Cited

U.S. PATENT DOCUMENTS

| 4,631,367 A | 12/1986 | Coviello et al. |
| 5,764,743 A | 6/1998 | Goedken |
| 5,826,196 A | 10/1998 | Cuthrell |
| 5,841,851 A | 11/1998 | Recht et al. |
| 6,141,341 A * | 10/2000 | Jones et al. .................. 370/352 |
| 6,259,775 B1 | 7/2001 | Alpert et al. |
| 6,385,193 B1 * | 5/2002 | Civanlar et al. ............. 370/352 |
| 6,404,764 B1 * | 6/2002 | Jones et al. .................. 370/352 |
| 6,580,710 B1 * | 6/2003 | Bowen et al. .............. 370/353 |
| 6,944,151 B1 * | 9/2005 | Menard ....................... 370/353 |
| 6,954,454 B1 * | 10/2005 | Schuster et al. ............ 370/352 |
| 2001/0030950 A1 * | 10/2001 | Chen et al. ................. 370/329 |

FOREIGN PATENT DOCUMENTS

| FR | 2 766 039 | 1/1999 |
| GB | 2 350 009 | 11/2000 |
| WO | WO 97/09800 | 3/1997 |
| WO | WO 97/19538 | 5/1997 |
| WO | WO 02/01318 A | 1/2002 |

* cited by examiner

*Primary Examiner*—Bob A. Phunkulh
(74) *Attorney, Agent, or Firm*—Law Office of Gerald Maliszewski; Gerald Maliszewski

(57) ABSTRACT

A system and method are provided for multiline telephony in a home-network telephone system. The method comprises: establishing a gateway; using the gateway for transceiving calls on a plurality of external telephone lines; and, bridging a call between a home-network endpoint and a selected external telephone line. Transceiving calls on a plurality of external telephone lines includes the gateway communicating call information in a format such as voice-over broadband (VoBB) or POTS. Bridging a call includes the gateway: converting between the external format and a digital home-network format; establishing a traffic channel between the gateway and the endpoint to communicate information in the home-network format; and, establishing an out-of-band control channel to manage the corresponding traffic channel.

58 Claims, 17 Drawing Sheets

Before: Call in progress is bridged from outside line to inside phone

After: VoBB line is placed on hold

SYSTEM AND METHOD FOR VIRTUAL MULTILINE TELEPHONY IN A HOME-NETWORK TELEPHONE

RELATED APPLICATIONS

This application claims the benefit of a provisional application entitled, SYSTEM AND METHOD TO PROVIDE VIRTUAL MULTI-LINE TELEPHONY SUPPORT IN A SINGLE-LINE HOME NETWORK TELEPHONE, invented by Carl Mansfield, Ser. No. 06/312,365, filed Aug. 14, 2001.

BACKGROUND OF THE INVENTION

1. Field of the Invention

This invention generally relates to home-network telephony and, more particularly, to a system and method for virtual multiline telephony for a home-network endpoint connecting to a gateway through a single channel.

2. Description of the Related Art

Service providers are rolling out multiline, broadband telephony services using, for example, DSL, cable modem, or fixed-wireless broadband access, to carry more than one line of voice data. As such, these carriers desire to deploy telephones that have multiline broadband telephony support in residential, small office home office (SOHO) and small and medium enterprises (SME) environments that subscribe to these broadband telephony services.

In current multiline integrated services digital network (ISDN) or plain old telephone service (POTS) telephones, all of the available external telephone lines terminate at the telephone itself. This allows for easy switching between lines, line selection, indications of line status, control of line-hold and multiparty conferencing capabilities. The majority of current POTS multiline telephones limit the number of lines supported to two, since typical residential POTS wiring comprises two pairs and can readily support up to two lines, but no more. In current multiline telephones, although all the supported lines terminate at the multiline phone itself, typically only one voice stream is active in a telephone call at any given time, since the multiline phone typically has only one mouthpiece and earpiece.

Home-network telephony systems are emerging that support multiple internally connected home-network telephony devices such as telephones, Fax machines, and multi-functional peripherals (MFPS). Typically, such home-network telephone devices share a digital home-network transmission media, such as a standard phoneline, an AC powerline, dedicated hardwires (such as Ethernet), or a wireless channel. Telephony adapters exist that allow a legacy analog phone to plug into and use digital home-network telephony. Likewise, integrated telephony devices are emerging that directly incorporate the digital home-network telephony interface.

However, conventional home-network telephony devices and adapters support only one audio path (channel) across the home-network. This limitation is highly desirable in order to maintain a low cost for such devices. However, conventional multiline telephony systems require all telephone lines, available at an endpoint, to be physically terminated at that endpoint, and support multiple simultaneous audio paths (one per telephone line) to the multiline endpoint.

It would be advantageous if calls to a home-network telephone system could enable home-network telephony endpoints to support multiline services while only requiring a single audio path to the endpoint, in order to maintain a low cost.

It would be advantageous if a home-network telephone system could readily supply multiline service to the home-network endpoints across a single, shared communication channel. Further, it would be advantageous if such a system could readily support more than two telephone lines.

SUMMARY OF THE INVENTION

The present invention provides a means for more fully integrating home-network telephone services. This invention allows a home-network system to mimic the provision of multiple external telephone lines to an endpoint, although only one audio path (channel) exists to the endpoint. In practice, the multiple lines terminate elsewhere, at a broadband gateway (GW), and the management of the shared channel and switching are controlled using out-of-band (control channel) signaling between the endpoint and the gateway. To the end user, the endpoint operates and behaves exactly as if all the external telephone lines came in parallel to the endpoint.

While conventional home-network telephone systems employ adapters to support legacy analog telephones, the present invention system permits the endpoint's user interface to use control channels signals to mimic multiline operation. This is not possible with the adapter approach. Further, the present invention system uses a broadband GW with voice capability to support a call hold feature, where an endpoint controls the GW, while the GW holds the call.

Accordingly, a method is provided for multiline telephony in a home-network telephone system. The method comprises: establishing a gateway; using the gateway for transceiving calls on a plurality of external telephone lines; and, bridging a call between a home-network endpoint from the gateway and a selected external telephone line.

Transceiving calls on a plurality of external telephone lines includes the gateway communicating call information in a format such as voice-over broadband (VoBB), which is used herein to collectively refer to voice over IP (VoIP), voice over ATM (VoATM), voice over DSL (VoDSL), and voice over cable modem (VoCM), POTS, or ISDN. Bridging a call includes the gateway: converting between the external line format and a digital voice over home-network (VoHN) format; establishing a traffic channel between the gateway and the endpoint to communicate information in the home-network format; and, establishing an out-of-band channel to manage the corresponding traffic channel.

In some aspects of the method, bridging a call includes bridging calls that originate from one of the external telephone lines and are answered at the home-network endpoint or calls, originated from the endpoint, that select one of the external telephone lines for an outgoing call.

Establishing an out-of-band channel to manage the corresponding traffic channel includes communicating control channel line status signals from the gateway to each endpoint. The line status signals indicate when a call is bridged to an endpoint and when the bridge between the call and the endpoint is cleared. The control channels also communicate line select signals from endpoints to the gateway for an endpoint to choose between the external telephone lines for an outgoing call. Alternately, the line select signals automatically select between idle external telephone lines.

Control channel call hold signals are used to interrupt a call bridged between an external telephone line and a first endpoint. Likewise, control channel retrieve signals are used to cancel the hold signal, so that a traffic channel is reestablished to the first endpoint. Alternately, a line select signal, instead of a retrieve signal can be used to reestablish the traffic channel. In some circumstances, the line select signal can be used to place a call on hold while another line is selected. The gateway can supply a hold audio message to the external telephone line to which the call has been interrupted. The hold message can be either music or voice-audio, and either predefined or user-defined.

Control channel conference signals are also used to provide multiparty calling capabilities. Such conference calls can be used by an endpoint to identify specific external telephone lines. Then, a traffic channel can be established between the endpoint and the identified external telephone lines in response to the conference signals. Alternately, the conference signals can be used to bridge a call to multiple endpoints in the system. The control channels can also be used to supply calling line ID (CLID) information identifying an incoming call calling party to an endpoint.

Additional details of the above-mentioned home telephony method, and a multiline telephony home-network system are provided in more detail below.

DETAILED DESCRIPTION OF THE PREFERRED EMBODIMENTS

Generally, the present invention system terminates a plurality of external telephone lines into a broadband gateway. The gateway distributes calls throughout the home to one of a plurality of telephony peripherals (phone, fax, modem, video telephone, multi-functional peripherals (MAPS), wireless communication devices, and hardwired communication devices) using home-network communications technology. These various telephone peripherals are referred to herein as home-network endpoints, or endpoints and the home-network communications technology employed is referred to herein as voice over Home-Network (VoHN). This approach is desirable as the gateway can more easily implement the complex broadband telephony clients than a telephone peripheral, while maintaining a low-cost overall system. The in-home telephone distribution protocols of the present invention system are presented below.

In order to support a multiline capability, it is necessary to support multiple simultaneous voice streams over the home-network system, one for each external line (POTS, VoBB or ISDN) that enters the customer premises. Further, it is necessary to permit each endpoint free access to all the external lines. While this can be done by providing for multiple simultaneous audio channels between each endpoint and the gateway, it is a costly duplication of circuitry in the endpoint and wasteful of home-network bandwidth. Therefore, the present invention system supports endpoints that have only a single, independent voice audio stream (channel) to the gateway. More specifically, these audio streams are carried on a common home-network communications or transmission media, using a VoHN protocol. Further, the VoHN protocol is capable of supporting a number of simultaneous independent audio streams, at least equal to the number of external telephone lines, with each such simultaneous independent audio stream terminating at a different endpoint.

The VoHN protocol includes traffic channels, which are the above-mentioned audio streams or channels and an out-of-band channel. Under the direction of an endpoint, the gateway is able to perform the function of switching between the external telephone lines in a manner that allows the endpoint to fully mimic multiline capability, despite the fact there is effectively only a single audio channel between each endpoint and the gateway. All the conventional multi-line phone features are supported by a combination of audio stream management in the broadband gateway and out-of-band signaling between the GW and the endpoints.

Figure 1:
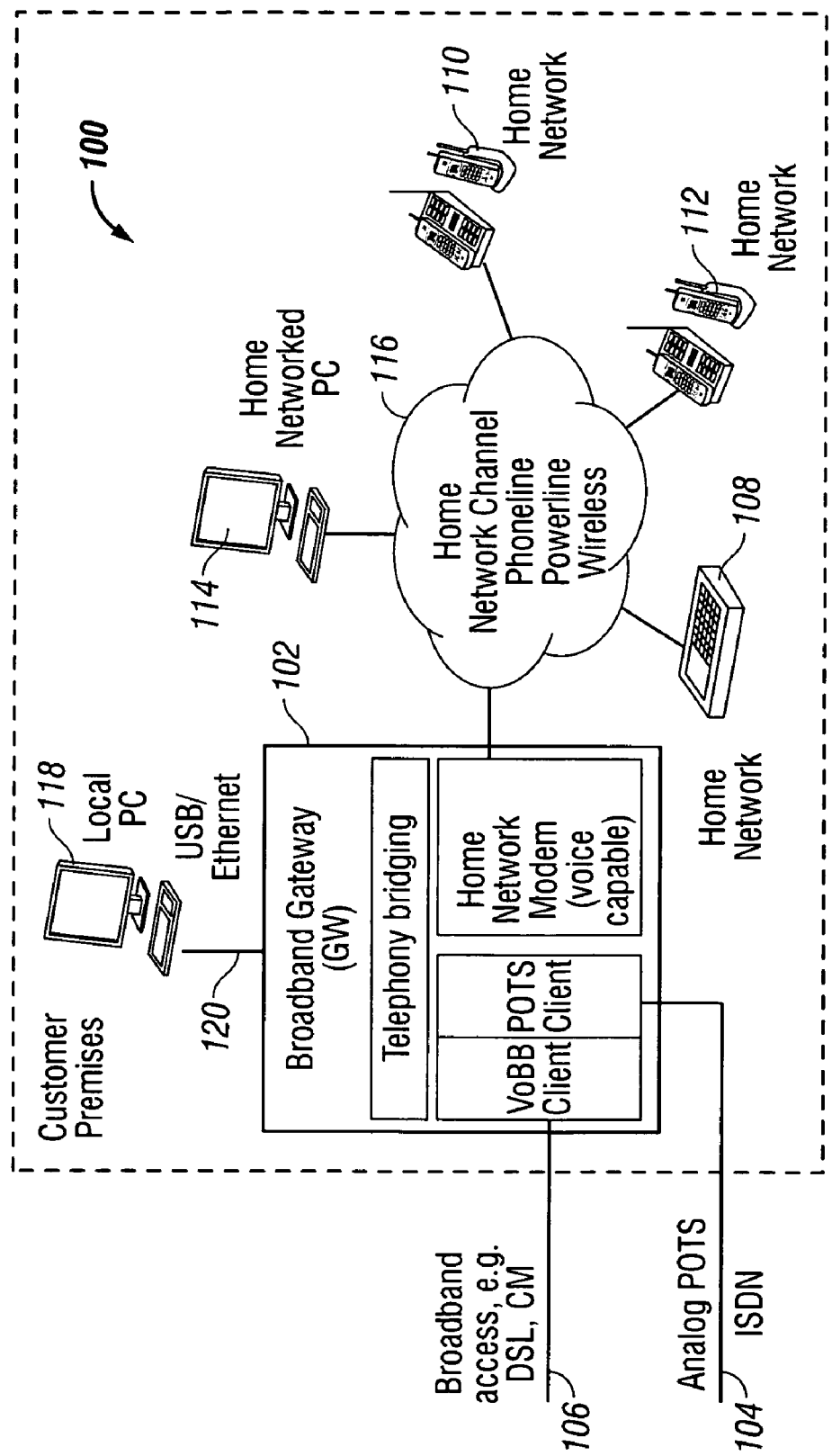
FIG. 1 is a schematic block diagram of the present invention multiline telephony home-network telephone system.

FIG. 1 is a schematic block diagram of the present invention multiline telephony home-network telephone system. The system 100 comprises a gateway (GW), or broadband gateway 102 having an input to transceive calls on external communication lines, which for simplicity are referred to herein as telephone lines or external lines. The gateway 102 transceives calls on external telephone lines that communicate call information in an external format that includes voice over broadband (VoBB). VoBB is understood herein the include voice over cable modem (VoCM), voice over DSL (VoDSL), voice over Ethernet, voice-over ATM (VoATM), and voice-over Internet Protocol (VoIP). Other supported formats include integrated service digital network (ISDN), fax-over-broadband, and plain old telephone service (POTS). As shown, external line 104 is for POTS or ISDN service and line 106 is for a broadband service such as DSL, cable modem, or fixed-wireless access. The present invention is not limited to any particular number of lines or specific telephone service external formats.

The home-network technology is used by the gateway 102 to extend the broadband data connection throughout the home to various personal computers (PCs), and data terminals and communication terminals. The gateway 102 acts as a router/firewall between the broadband access connection to the ISP and Internet, and in-home data devices on the home-network. The home-network technology is also capable of transmitting high-quality voice traffic. The system 100 uses protocol enhancement on top of the conventional home-network technology, referred to herein as a voice over home-network (VoHN) protocol.

In some aspects, the system 100 permits a fallback to basic, line-powered, legacy analog POTS operation. This support for "lifeline" telephony provides access to telephone service in the case of power failure, or broadband service failure. Note that, if the gateway 102 integrates DSL as the broadband access, the POTS service can enter the gateway 102 via the same physical connector. Otherwise, an additional jack for incoming POTS is required (as shown). Thus, the gateway 102 can implement analog POTS client(s), ISDN client(s), and voice over broadband client(s). This allows the gateway 102 to answer an analog call, an ISDN call, or broadband network call, and bridge this to voice over home-network (VoHN) service inside the home.

The system 100 includes at least one home-network endpoint, although typically the system 100 may include a plurality of endpoints. Shown are endpoints 108, 110, 112, and 114, although the system 100 is not limited to any particular number of endpoints. Each endpoint 108–114 has a port to receive calls via a common transmission media 116 shared between endpoints. The single shared transmission media 116 is connected to the port of each endpoint 108–114. The channel can be an Ethernet line, a telephone hardline, an AC powerline, a dedicated hardline, coaxial cable, or a wireless communication channel (code division, time division, or frequency division). The gateway 102 has a port for transceiving calls on a plurality of external telephone lines 104/106 and a port connected to the transmission media 116 for bridging a call on one of the external telephone lines to one of the internal endpoint devices.

The gateway 102 transceives calls on the external telephone lines 104/106 in an external format, where the external format is the VoBB, ISDN, or POTS protocol for example. The gateway 102 converts between the external format and a digital home-network format, establishes a traffic channel on media 116 between the gateway and the endpoint to communicate information in the home-network format, and establishes an out-of-band channel on media 116 to manage the corresponding traffic channel.

For example, the gateway 102 transceives calls on a first external telephone line 104 and second external telephone line 106. The gateway bridges a call between the first endpoint 108 and either the first external telephone line 104 or the second external telephone line 106. In this manner, it appears (from the perspective of the first endpoint 108) that the first endpoint has a multiline selectable connection to a plurality of external telephone lines. This virtual multiline connection exists regardless of whether the endpoint receives or originates the call. That is, the gateway 102 bridges calls received via one of the plurality of external telephone lines, or calls, originated from the endpoint, that select one of the plurality of external telephone lines for the outgoing call.

A variety of out-of-band control channel communications are established between the gateway 102 and the endpoints 108–114. In one aspect of the system 100, the gateway 102 communicates control channel line status signals to each endpoint 108–114. Each endpoint 108–114 receives the line status signals to indicate when a call is bridged to an external telephone line, or to indicate that the external telephone line is not available, or to indicate when the bridge between the call and the external telephone line is cleared, to show that the external telephone line has become available.

Figure 2:
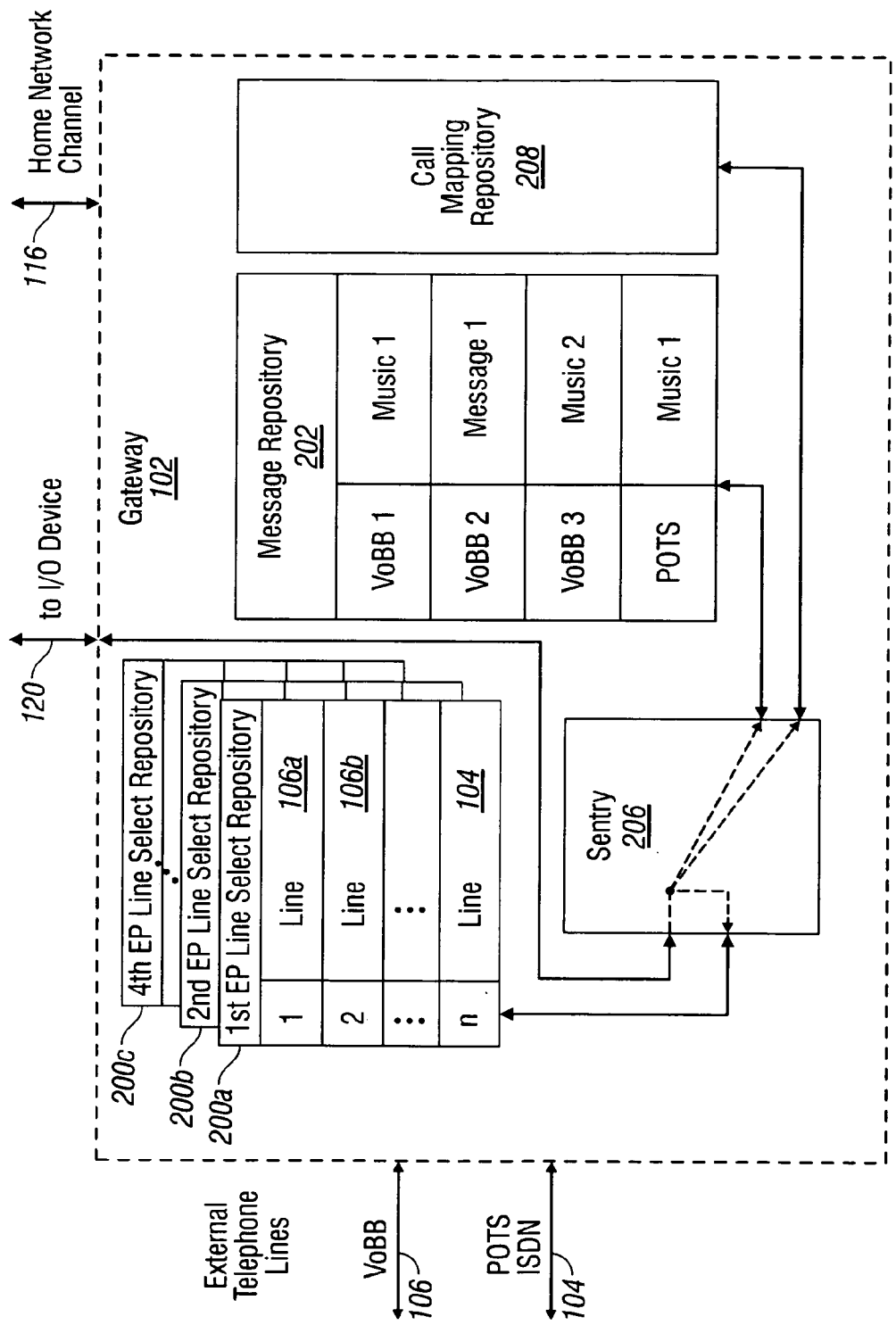
FIG. 2 is a schematic block diagram illustrating additional features of the gateway of FIG. 1.

FIG. 2 is a schematic block diagram illustrating additional features of the gateway 102 of FIG. 1. In another aspect the gateway 102 receives control channel line select signals from endpoints. An endpoint, first endpoint 108 for example, uses the line select signal to choose between the plurality of external telephone lines 104/106 for an outgoing call. Alternately, the first endpoint 108 uses the line select signal to automatically select between a plurality of idle (available) external telephone lines, for an outgoing call. In this aspect, the gateway 102 includes a line select repository 200 (200a, 200b, and 200c) with an idle external telephone line order of selection (priority ranking). For example, the user may have a plurality of VoBB external lines (106a and 106b are examples) and a POTS line 104. A separate line select repository exists for each endpoint. Shown are line select repositories 200a, 200b, and 200c for the first endpoint, the second endpoint, and the fourth endpoint, respectively. A distinct order of selection can be made for each endpoint in the system. As shown in the line select repository 200a, the first choice is line 106a, while the last choice is line 104. For the first endpoint for example, when an idle external telephone line is automatically selected, the gateway goes to the line select repository 200a and selects the idle (available) line highest on the priority list. The endpoints use control channel auto select configuration signals to request the current order of selection and to edit the idle external telephone line order of selection in the line select repositories.

In another aspect of the system, the gateway 102 receives control channel call hold signals from the endpoints 108–114. Typically, only the endpoint bridged into a call can place that call on hold. For example, the first endpoint 108 uses the hold signal to exclusively interrupt a call bridged between an external telephone line, line 104 for example, and the first endpoint 108. In other aspects, any of a plurality of endpoints, for example the second endpoint 110, can use the hold signal to interrupt a call bridged between an external telephone line, line 104 for example, and the first endpoint 108.

The gateway 102 also receives control channel retrieve signals from the endpoints 108–114. With reference to the above example, the first endpoint 108 uses the retrieve signal to cancel hold status on line 104. Then, the gateway 102 establishes (reestablishes) a traffic channel to the first endpoint 108 in response to the retrieve signal and bridges the previously held call on external line 104 to endpoint 108.

In addition to the function of selecting an external telephone line from an endpoint, line select signals can be used to cancel a call hold. The gateway 102 receives control channel line select signals from the endpoints 108–114. Still referencing the above example, the first endpoint 108 uses the hold signal to interrupt a call bridged between the first endpoint 108 and external telephone line 104. Subsequently, the first endpoint 108 uses the line select signal to identify the external telephone line 104. The gateway 102 establishes a traffic channel between the first endpoint 108 and the gateway 102 bridges the previously held call on external line 104 to endpoint 108 in response to the line select signal.

Alternately, the first endpoint 108 can use the line select signal to initiate a hold, for example as follows. The first endpoint 108 has an open traffic channel to the gateway 102, where this traffic channel is bridged to external line 104. Thus, the first endpoint 108 has an active call involving external line 104. The first endpoint 108 then sends a line select signal to the gateway to identify a different external telephone line, for example line 106. In response to receiving the line select signal, the gateway 102 places on hold the previously active call on line 104 and modifies its bridging such that the traffic channel to endpoint 108 is now bridged to external line 106. This option can be used when the endpoint receives a call on external telephone line 106, while engaged in a call on line 104. The call on external telephone line 104 would be placed on hold as a result of this action and can be later retrieved.

Alternatively, the first endpoint 108 may initially send a hold signal to interrupt a call bridged to a first external line 104 and subsequently send the line select signal to bridge to a second external line 106. This differs from the previous example since the use of the additional hold signal results in termination of the traffic channel between the first endpoint 108 and the gateway 102, and the subsequent use of the line select signal results in reestablishment of a traffic channel between the first endpoint 108 and the gateway. The previously described approach, where only the line select signal is used, does not result in this manner of termination and reestablishment of the traffic channel between endpoint 108 and the gateway 102.

In some aspects of the system 100, the gateway 102 includes a message repository 202 to store hold messages that are supplied to the external telephone line to which the call has been interrupted. The message repository 202 supplies a hold message such as music or a user-defined message. The hold message can be different for each external line as shown, or alternatively, different for each endpoint (EP). A personal or pre-recorded voice message is an example of a typical user-defined message. If music is selected, a different music source is selectable for each endpoint or for each external line, as and if desired.

Returning to FIG. 1, the system 100 further comprises an input/output (I/O) device 118 having a port on line 120 in communication with the gateway message repository for editing the stored hold messages. The I/O device 118 can be a personal computer (PC) with software applications or a web browser application to communicate with a gateway web server (not shown). Returning to FIG. 2, in some aspects, the gateway 102 includes a sentry circuit 206 to control access to the message repository 202. The input/output device 118 must pass sentry circuit security protocols to edit the hold messages. For example, a password must be submitted and verified. In some aspects, the endpoints 108–114 can also be used to edit the hold messages, but the user interfaces of the I/O device 118 are likely to be more convenient than the endpoint interfaces.

Returning again to FIG. 1, the gateway 102 also communicates control channel conference signals with the endpoints 108–114 to bridge an endpoint to a plurality of external telephone lines. For example, the first endpoint 108 uses conference signals to identify external telephone line 104 and external telephone line 106. Then, the gateway 102 establishes a traffic channel between the first endpoint 108, external telephone line 104, and external telephone line 106 in response to the conference signals. Likewise, endpoints can be conferenced together. For example, the first endpoint 108 uses conference signals to identify the second endpoint 110, and the gateway 102 establishes a traffic channel between the first endpoint 108, an external telephone line, and the second endpoint 110 in response to the conference signals.

In some aspects, the gateway 102 sends control channel line calling signals to the endpoints 108–114. For example, when a call is received addressed to the first endpoint 108, the first endpoint 108 uses the line calling signals to detect an incoming call. This detection may cause the endpoint to "ring". The line calling signals also give the first endpoint 108 an indication of the external telephone line on which the incoming call is being transceived. The endpoint user interface may indicate that the call is on external telephone line 104, for example. In some aspects, the gateway 102 may be configured to ring, or notify a limited number of endpoints when calls are received on specified external telephone lines. For example, the gateway 102 may be configured to ring all the endpoints but the children's phone in response to receiving calls on a external telephone line used only for business.

Returning briefly to FIG. 2, the gateway 102 includes a call mapping repository 208 with a list of external telephone lines cross-referenced to endpoints. The list indicates the endpoints that are to be notified, using line calling signals, in response to incoming calls. For example, the first endpoint may ring in response to calls on the first and second external telephone lines, while a second endpoint rings in response to calls on only the second external line.

An endpoint or I/O device 118 can communicate control channel call mapping signals to the gateway requesting the call mapping repository configuration. The gateway 102 uses control channel call mapping signals to send the call mapping repository information to the requesting endpoint. Further, the endpoint can use control channel call mapping signals to the gateway for editing the cross-referenced listings in the call mapping repository. The call mapping repository 208 can also be accessed, established or edited from the I/O device 118. As above, the sentry 206 can be used to guard access to the call mapping repository 208, before editing or other modifications can occur.

Likewise, an endpoint or I/O device 118 can communicate control channel line select signals to the gateway requesting line signal repository configuration. The gateway 102 uses control channel to send the repository information to the requesting endpoint, and the endpoint (or I/O device) can use control channel signals to the gateway for editing the line select repository cross-referenced listings. The sentry 206 can be used to guard access to the line select repository 200, before editing or other modifications can occur.

In some aspects of the system 100, the gateway 102 receives calling line ID (CLID) information (in a POTS format the information is in the form of tones) on the external telephone lines 104/106 to identify an incoming call calling party. The gateway 102 converts the calling line ID information to caller ID information in a digital home-network format, and uses the control channel to communicate the digital format caller ID information to the endpoints 108–114.

For example, an endpoint may have an active call in progress so it cannot receive in-band CLID information, as there is only has one audio path. But, the endpoint can receive control messages. This allows the endpoint to show that a call on a different line is incoming or "ringing", even thought the endpoint doesn't actually ring. The endpoint can, of course, then show which line is ringing and provide the CLID of the calling party on its display. This allows the user to look at who is calling before deciding whether to put the active call on hold to take the new call.

Functional Description of the System

As noted above, a key point of the system architecture is that the broadband GW acts as an entry point for broadband access service to the home, such as VoBB, POTS, or ISDN. The GW supports these services by integrating a VoBB client, POTS client, or ISDN client, respectively. The particular service is terminated at the client in the GW. The broadband access data connection has sufficient bandwidth and capability to carry multiple simultaneous telephone lines and broadband data service. The broadband GW also integrates a home-network communications system, possibly based on one or more of phoneline, hardline, wireless and/or powerline technologies. The GW is able to bridge telephony between the VoBB service on the access system and the VoHN transport in the home-network. This allows the home-network telephony endpoints to access the VoBB services to make and receive VoBB telephone calls, even though they do not implement a VoBB client directly.

Figure 3:
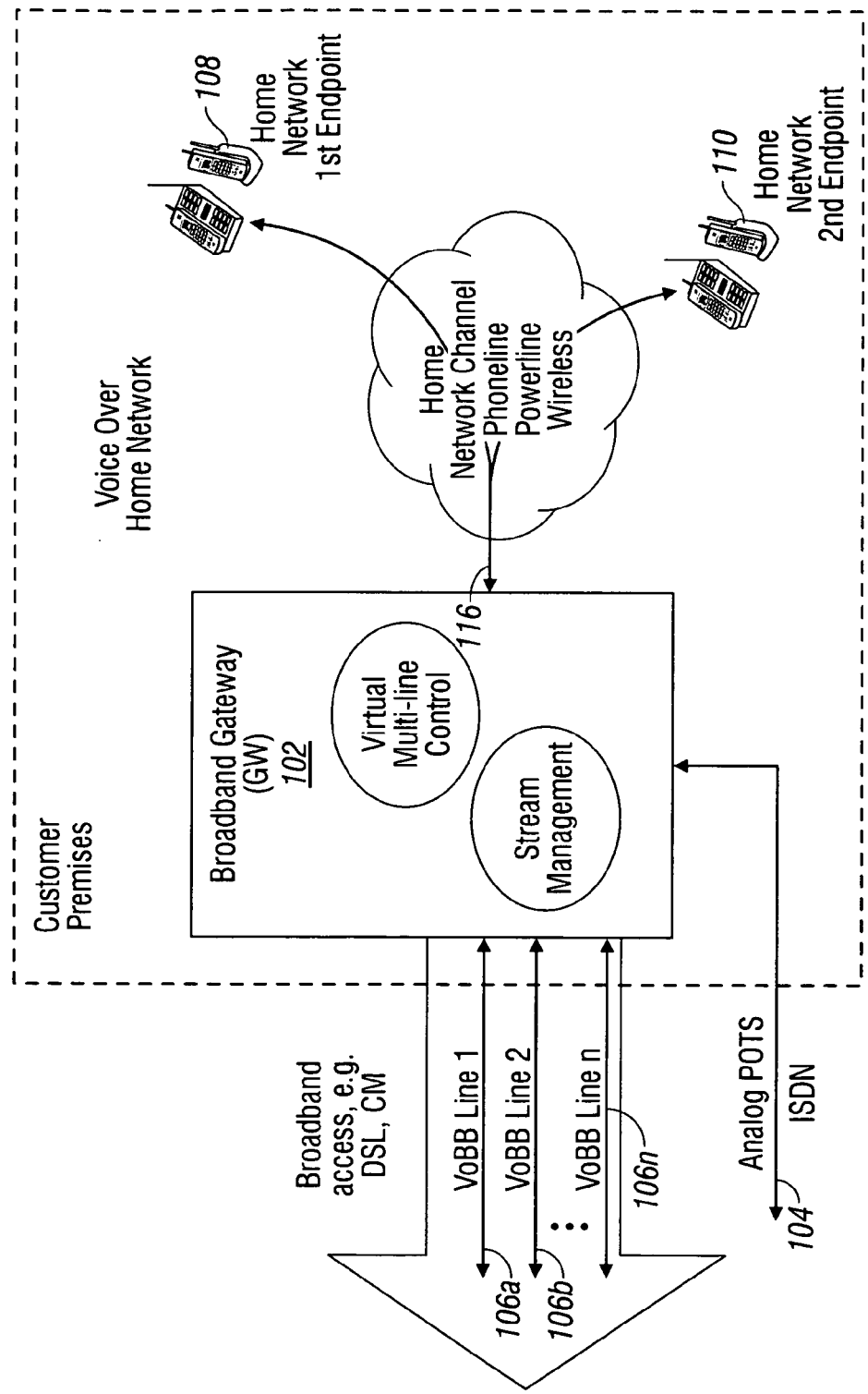
FIG. 3 is a schematic block diagram illustrating the gateway control functions.

FIG. 3 is a schematic block diagram illustrating the gateway control functions. The VoBB enabled broadband gateway 102 supports n lines of VoBB service (106a–106n). The GW 102 may also support one or more line(s) of analog POTS or ISDN (line 104). The GW 102 is able to distribute the incoming voice calls to one or more VoHN enabled endpoints. In order to support the virtual multi-line capability, the GW 102 must integrate two key functions.

Virtual Multi-line control: this implements the necessary state machines and control channel signaling protocols needed to control the multiline operation. The signaling protocol is part of a VoHN protocol extended to provide multiline support. The part of the protocol that resides in the GW is considered the virtual multiline server.

Stream management: this function is capable of switching voice audio streams from one source to another, placing an audio stream on hold at the GW or bridging three or more audio streams together to form a multi-party call.

Stream management is comprised of three basic functions: basic stream bridging; stream hold; and, multi-party stream bridging.

Basic stream bridging permits two audio paths to be bridged together through the GW 102. Three types are supported: VoBB to VoHN (external call on VoBB derived line); POTS to VoHN (external call on Analog POTS/ISDN); and, VoHN to VoHN (internal extension to extension call).

In general, the GW 102 can switch multiple streams in parallel so that at least all external lines can be in use by different VoHN endpoints at the same time.

Figure 4:
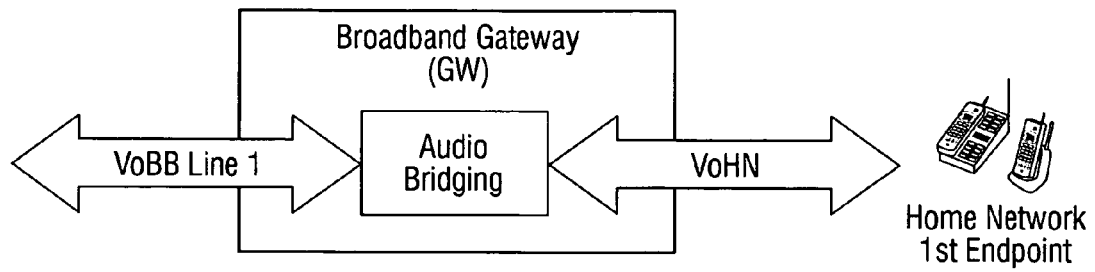
FIG. 4 is a diagram illustrating the stream hold function as exercised in the system of FIG. 1 or 3.
Figure 4:
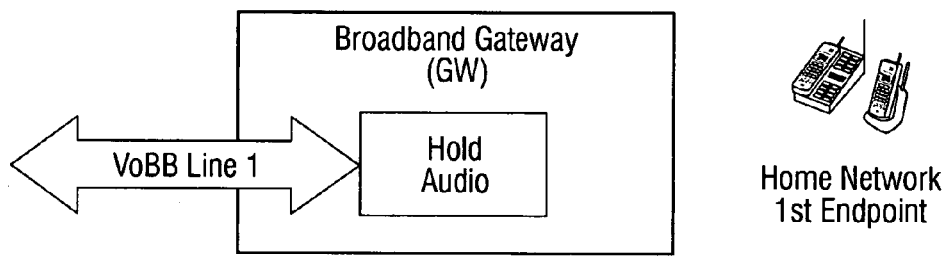

FIG. 4 is a diagram illustrating the stream hold function as exercised in the system 100 of FIG. 1 or 3. The hold, or stream hold function permits the gateway 102 to place a call that is bridged to an endpoint on hold. As shown, a call between the first endpoint and an outside line (VoBB line 1) is in progress, bridged by the GW. The call is then placed on hold at the request of the first endpoint. The VoBB line is maintained and terminated by a hold at the GW. The GW generates music, or other audio message that is played to the party on the external telephone line. The audio path between the GW and the endpoint is released as part of the stream hold process.

Users of the system have the ability to modify, or even record their own hold music/message. A different hold audio music/message type can be generated for each external line or endpoint. These "hold messages" can be selected, recorded, or modified, a process referred to herein as editing, using a PC I/O device connected to the GW, or alternatively via an endpoint interface. As previously mentioned, these hold messages are stored in the message repository 202, See FIG. 2.

Figure 5:
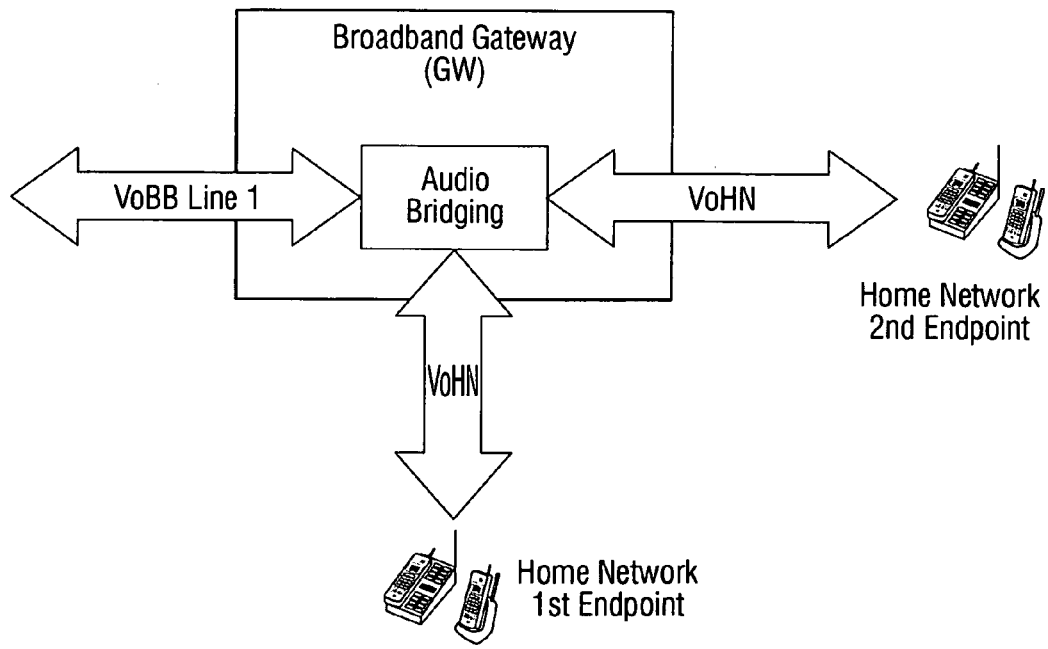
FIG. 5 illustrates the conferencing function as exercised in the system of FIG. 1 or 3.

FIG. 5 illustrates the conferencing function as exercised in the system 100 of FIG. 1 or 3. Conferencing, or multi-Party stream bridging permits the GW to combine more than two streams together to form a multi-party call. As shown, the GW is able to bridge and combine the audio paths of more than two sources into a multiparty conference call. For example, there is only one external line with two internal endpoints, and a call is in progress with one endpoint. When the second phone is taken off-hook, it is bridged into the existing call. This way, although VoBB/VoHN is used, the behavior is similar to legacy, single-line POTS. Although the figure implies a separate line to each endpoint, it should be understood that the endpoints are connected to the gateway through a common transmission media, as described above.

A set of control channel messages are used to enable the virtual multiline operation of the present invention system. As described above, multiple logically different messages are defined. In implementation, these messages can be combined to simplify operation. For example, multiple logical messages can be conveyed in a single physical message (e.g. the "Line calling" and "line in use" message could be carried by one physical message which defines its logical meaning via the contents of the message).

Six logical out-of-band messages are defined by this invention originating from VoHN telephony product to the GW. They are: line select (manual or auto select); hold; retrieve; conference; auto select configuration (request and edit); and, call mapping (request and edit).

Four new logical out-of-band messages are defined in the present invention system originating from the GW to the VoHN telephony endpoints. They are: line calling; line status (line in-use and line cleared); auto select; and, incoming call mapping.

Figure 6:
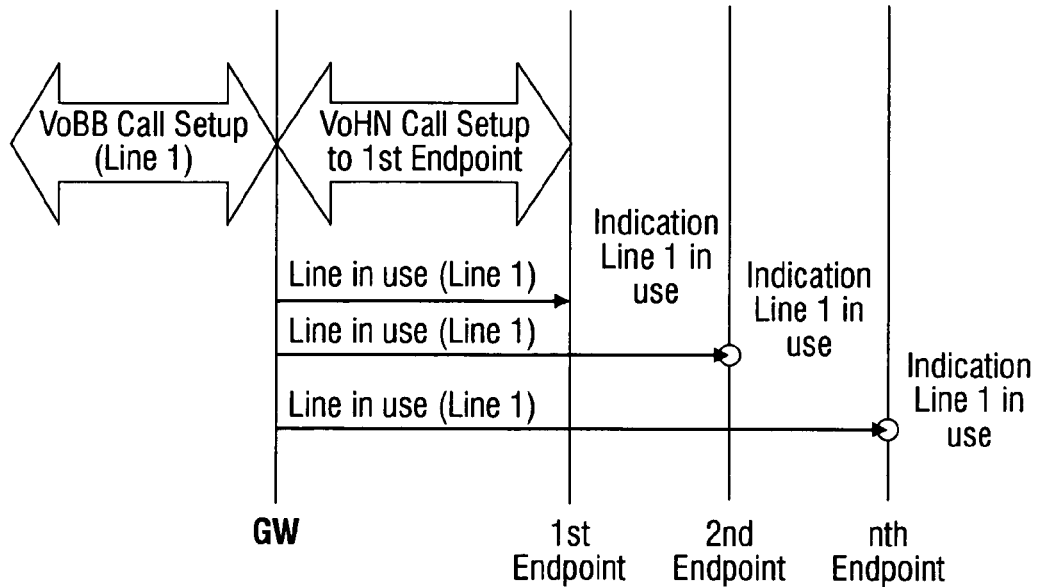
FIG. 6 is a diagram illustrating a first operation of the line status control signals.

FIG. 6 is a diagram illustrating a first operation of the line status control signals. Conventional multiline telephones have some method to indicate to the user that a line is in-use, for example by LED or LCD display. This state can readily be detected by the phone since every line terminates at the phone, and changes in line voltage can be used to determine that the line is "off-hook". In the present invention system, the external telephone lines terminate at the gateway rather than at the endpoint. Instead, the gateway detects the status of each line and sends an out-of-band VoHN (control channel) "line in-use" message, referred to herein as a line status signal, to all multiline endpoints to indicate the line status. The line-in-use message is a type of line status signal.

As soon as one of the external telephones lines (e.g., VoBB line 1) becomes in use, the GW sends a "line in-use" message to the other VoHN endpoints to indicate this status. Note that the external telephone line could be in use by potentially any internal endpoint. When each of the VoHN endpoints receives this message, a representation of appropriate line status is made by some visual means on the endpoint's user interface (UI). For example, Line1 LED is illuminated, or LCD displays "Line 1 in use".

The "line in-use" message indicates which of the available external telephone lines is in use and is sent to every VoHN endpoint in the home-network system. Note that the line can be identified by a simple number (e.g. "1"), its telephone number (e.g. "555-555-5555") or a character string that has been associated with that line (e.g. "Office line"). This message could be sent to every endpoint together as a single broadcast message or individually to each endpoint as indicated in FIG. 6. If sent individually, an acknowledgement (not shown in the figure) can be sent by the recipient to ensure the message is received (lack of acknowledgement results in re-sending the message). If the broadcast approach is used, it can be sent many times to increase the robustness of the transmission of the message.

Figure 7:
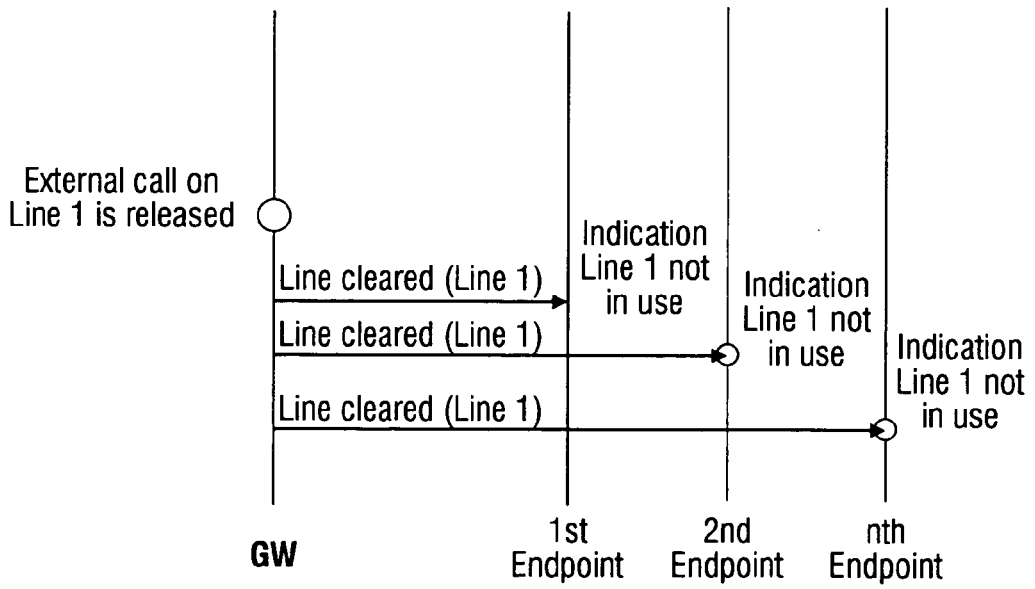
FIG. 7 is a diagram illustrating a second operation of the line status control signals.

FIG. 7 is a diagram illustrating a second operation of the line status control signals. When the GW detects that a line is released, a similar message to "line in use" is sent from the GW to every VoHN endpoint. This message is the "line cleared" message, a type of line status signal.

Again, the line-cleared message could be a broadcast message or sent individually to each VoHN endpoint. The message includes an indication of which line has been cleared so that each endpoint can adjust its UI accordingly. If sent individually, an acknowledgement (not shown in the figure) can be sent by the recipient to ensure the message is received (lack of acknowledgement results in re-sending the message). If the broadcast approach is used, it can be sent many times to increase the robustness of the transmission of the message.

Note, it is logical for the line-in-use and line cleared signals to be combined together into one physical message. Line status signals have parameters included such as the line ID, and a flag indicating in use, cleared, or potentially some other status (e.g. line fault).

Figure 8:
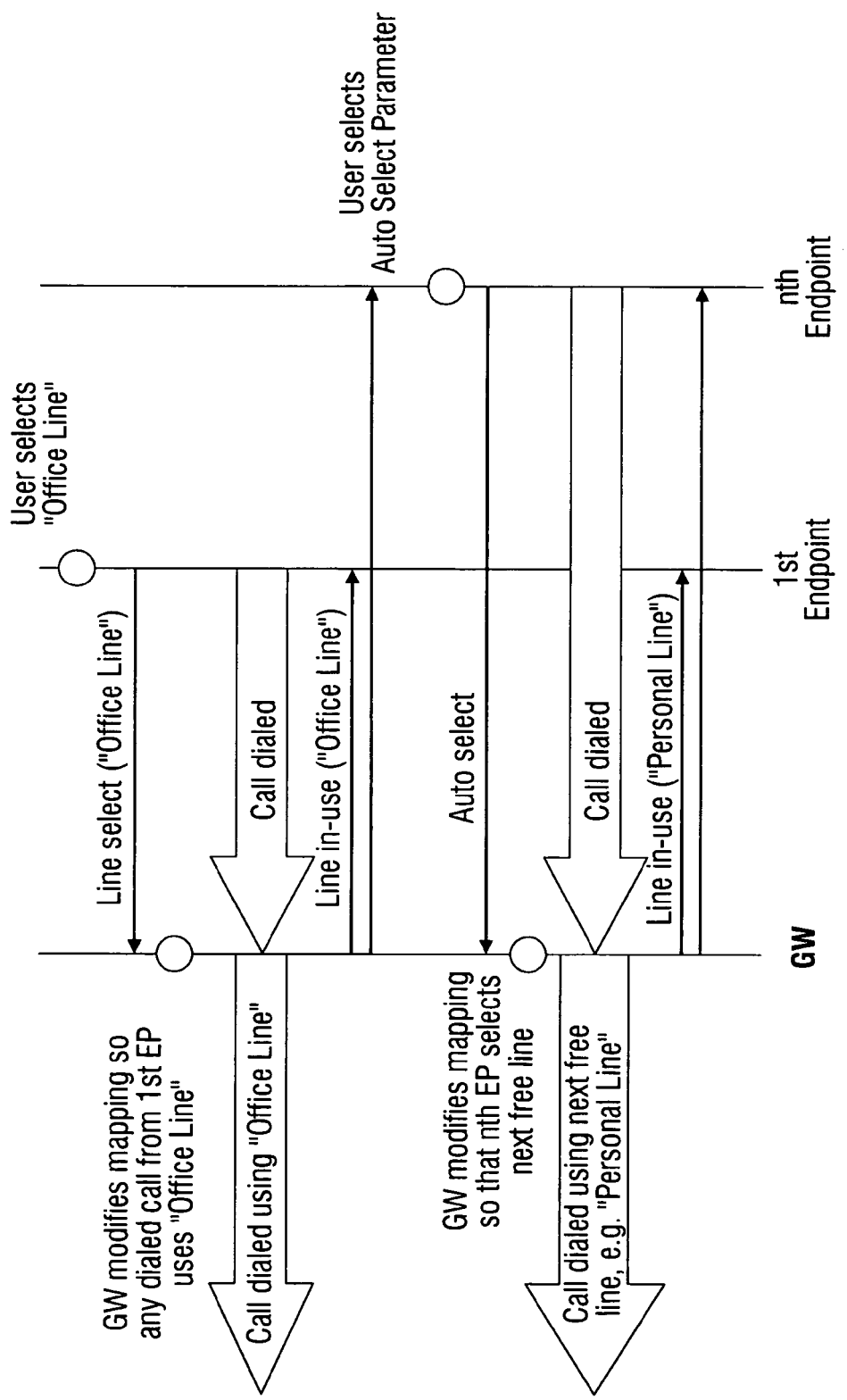
FIG. 8 is a diagram illustrating the operation of the line select signals.

FIG. 8 is a diagram illustrating the operation of the line select signals. A multiline phone or endpoint typically has some UI means for the user to select from the available external telephone line for outgoing calls. In a conventional system, the mouthpiece and earpiece of a phone is switched between external telephone lines that are physically connected to the phone. In the present invention system, an out-of-band control channel message must be sent from the endpoint to the GW, since it is the GW that handles the mapping of the endpoint's audio to an external line for outgoing calls.

As shown, a user at the first endpoint selects the "Office line". This can be done using a button or soft function key in combination with LCD display. This UI input results in the phone sending an out-of-band message to the GW "Line select", instructing the GW that the first endpoint should be mapped to the "Office line" for outgoing calls. When a call is dialed by the first endpoint, the GW maps the call to the external telephone line identified as the "Office line". Alternately, external telephone lines can be identified using simple numbers, telephone number, or an ASCII string. Note that the figure also shows the GW sending the line-in-use message, to indicate that "Office line" becomes busy as a result of the first endpoint making an outgoing call.

Another option is to set an endpoint in a mode where the next available idle telephone line is automatically selected. This way, the user does not need to manually find an external telephone line before dialing. As shown, the user of the nth endpoint selects the line select message with the auto select parameter. This results in the out-of-band line select message being sent to the GW. The GW sets the mapping for outgoing calls into auto select for the nth endpoint. Typically, there is a selection order defined at the GW to determine idle external telephone line priority (refer to the line repository 200, see FIG. 2). Then, when the caller makes a call from the nth endpoint, the next idle external telephone line is selected. As shown, the "Personal line" is selected and a "line in use" message is sent to every VoHN endpoint.

Note that it would be quite logical to combine the line select message with auto select parameter into a single physical message in a VoHN protocol, such that parameters of the message can be used to communicate alternate logical meaning.

Figure 9:
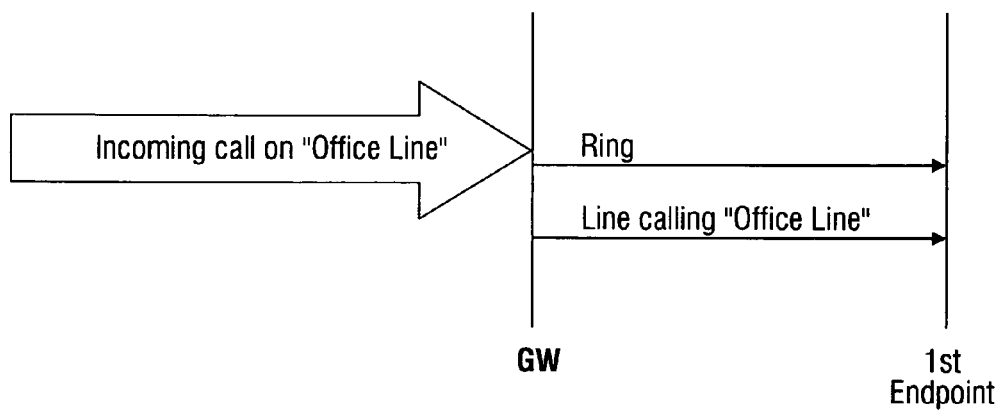
FIG. 9 is a diagram illustrating the operation of the line calling signals.

FIG. 9 is a diagram illustrating the operation of the line calling signals. With a conventional multiline phone, the phone will ring when any one of the connected external lines receives an incoming call. For example, the phone can detect the ringing signal directly due to ringing current that is passed over the line. Likewise, in the present invention system, a typical multiline VoHN endpoint can be mapped to more than one external telephone line, such that incoming calls from more than one source line ring the endpoint. However, in this system the gateway detects the ringing of the external line and passes this information to the endpoint using an out-of-band message.

As shown, an incoming call is mapped to the first endpoint. On detecting the incoming call on the external line, the GW sends an out-of-band "Ring" message to the first endpoint that causes the first endpoint to ring. The GW then sends an out-of-band "line calling" message that indicates it is the "Office line" external telephone line that attempting to bridge a call. This result in indication to the user of which line has been dialed, either by LED, LCD display or by different pitch of ringing tone. Note that either the "line calling" message or the "Ring" message, or both, may carry Calling Line ID (CLID) information.

Note that it is natural to combine the ring and line calling control channel messages together into a single physical message. The ring message can actually be sent many times to turn the ringer of the endpoint on and off (toggling the state). These messages are sent frequently in a pattern, and toggle the ringer in the endpoint on and off according to the desired ringing pattern. Therefore, if the caller gives up attempting to connect, and the call was not answered, the ring messages will cease with the endpoint's ringer toggled in the off state.

Figure 10:
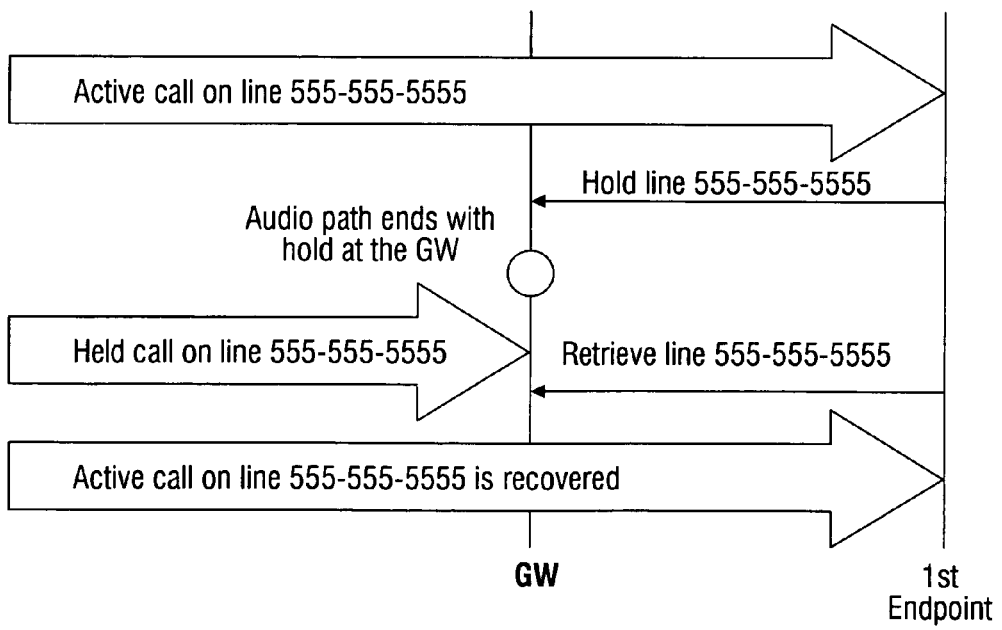
FIG. 10 is a diagram illustrating the operation of the hold and retrieve signals in a simple hold scenario.

FIG. 10 is a diagram illustrating the operation of the hold and retrieve signals in a simple hold scenario. A typical legacy multiline phone can place one call on hold in order to either answer another incoming call, or to make another outgoing call. These same features can be mimicked in the present invention system multiline endpoint using out-of-band signaling, although the actual switching of audio paths occurs in the GW, rather than in the endpoint itself.

Shown is a simple hold operation, where a call from one party is placed on hold and then retrieved, without any other external telephone lines or endpoints being involved. Here, the GW is bridging a call from line "555-555-5555" to the first endpoint. The user of the first endpoint selects hold from the UI on the phone. This results in an out-of-band "Hold" message being sent to the GW, indicating which line should be held. In some aspects, the GW acts only on a hold request that originates from an endpoint that is bridged to that external telephone line. When it receives the message, the GW stops bridging (interrupts) the call and instead terminates the incoming audio path inside the GW, playing back the appropriate "Hold music" to the person who is on hold. The audio path between the GW and the endpoint can be held open, but does not necessarily communicate any audio information. Later, when the user selects to take the call off hold, using the first endpoint UI, a "retrieve" message is sent to the GW, indicating which call to retrieve (based on the external telephone line ID). When the GW receives this message it once again connects the held audio path to the audio path through to the endpoint, re-establishing the call. Note, it would be logical to combine the hold and retrieve control channel messages into a single physical message, with parameters to indicate whether a hold or retrieve function is required.

Figure 11:
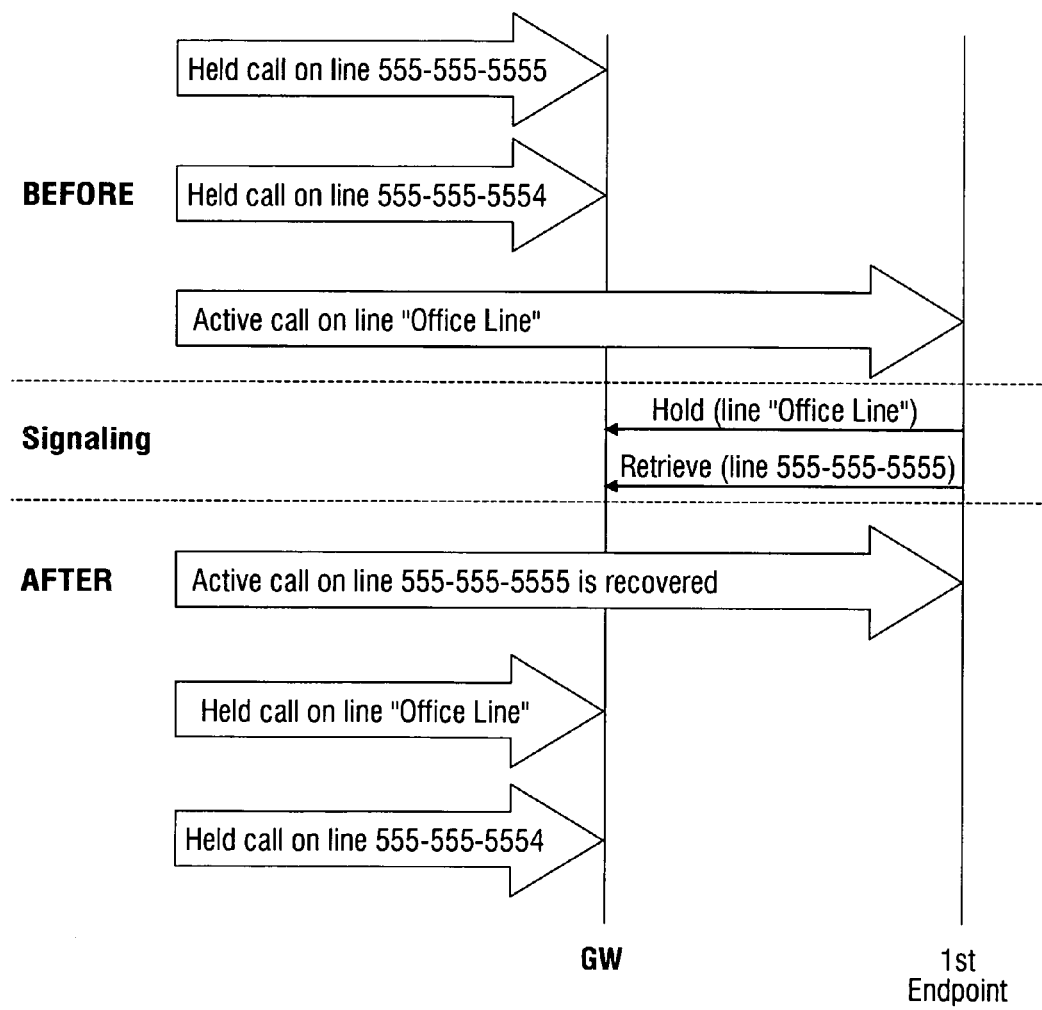
FIG. 11 is a diagram illustrating the operation of hold signals to switch between external telephone lines.

FIG. 11 is a diagram illustrating the operation of hold signals to switch between external telephone lines. A legacy multiline phone is able to switch among many held calls, retrieving the desired call from many calls that are potentially on hold. There are two ways to invoke this operation in the present invention, one of which is described by FIG. 11. In this scenario, the user begins with an active call in progress on line "Office Line" and two held calls, one on line 555-555-5555 and one on line 555-555-5554. The user first selects to put the active call on hold, which results in a hold message being sent to the GW. The GW then places that active call on hold (same method as for simple hold), but keeps the audio path open between the GW and endpoint. When the user selects to retrieve a different call on hold, the retrieve message is sent to the GW. This causes the GW to switch the previously held audio path to the open audio path through to the endpoint, which recovers the previously held call. Alternately, the GW can drop the previously active call put on hold.

Figure 12:
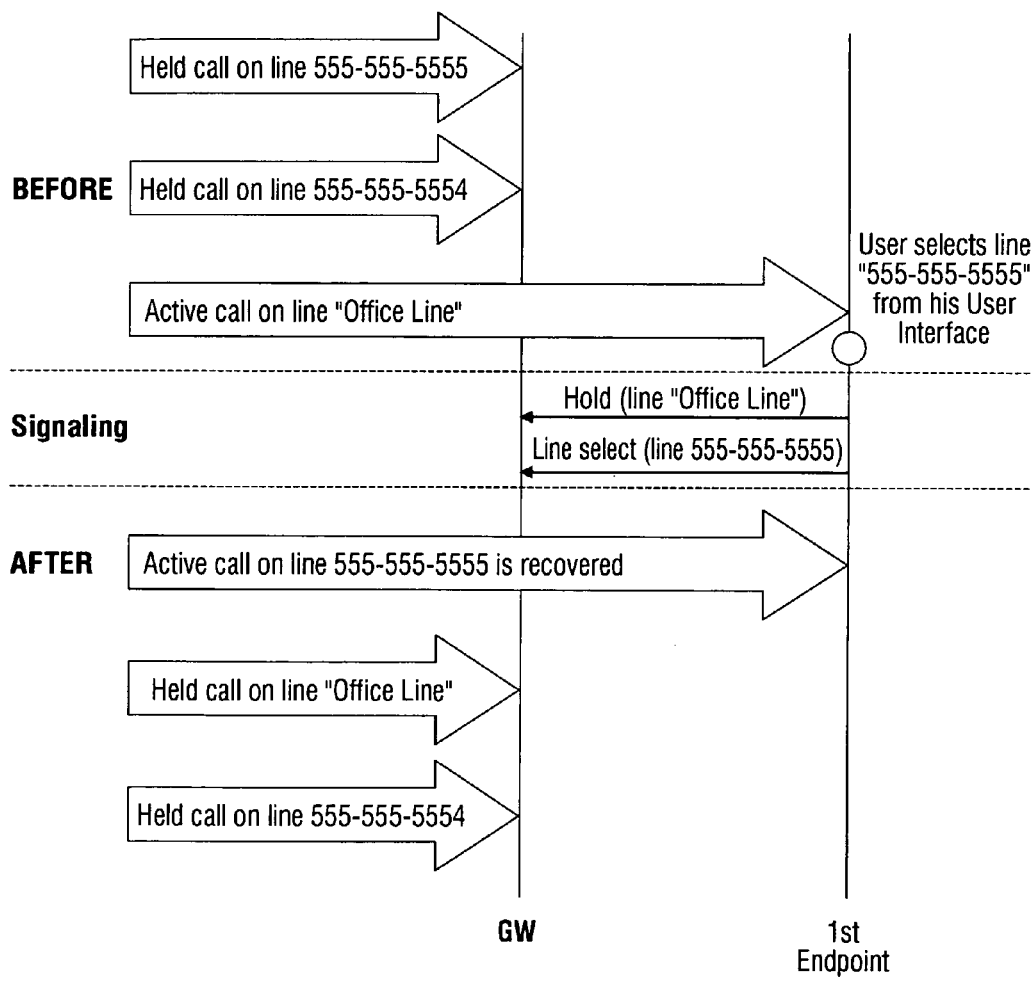
FIG. 12 is a diagram illustrating an alternate process than the one described by FIG. 11 for retrieving a call on hold.

FIG. 12 is a diagram illustrating an alternate process than the one described by FIG. 11 for retrieving a call on hold. As shown, the user simply selects a different line from his endpoint's UI and does not explicitly place the current call on hold first. This can cause one of two actions by the endpoint. Either the endpoint first sends a hold signal for the current line, and then the line selection signal. These actions result in the original call being held at the GW, and the call from the selected line being retrieved in the same manner as the previous example of FIG. 11. Alternately, the endpoint does not send the hold signal, but only sends the line selection signal. In this case, the gateway immediately switches the audio streams so that the previously held call on the selected line is recovered. The call on the line that was active before this switch can either be placed on hold, as shown in FIG. 12, or terminated.

Figure 13:
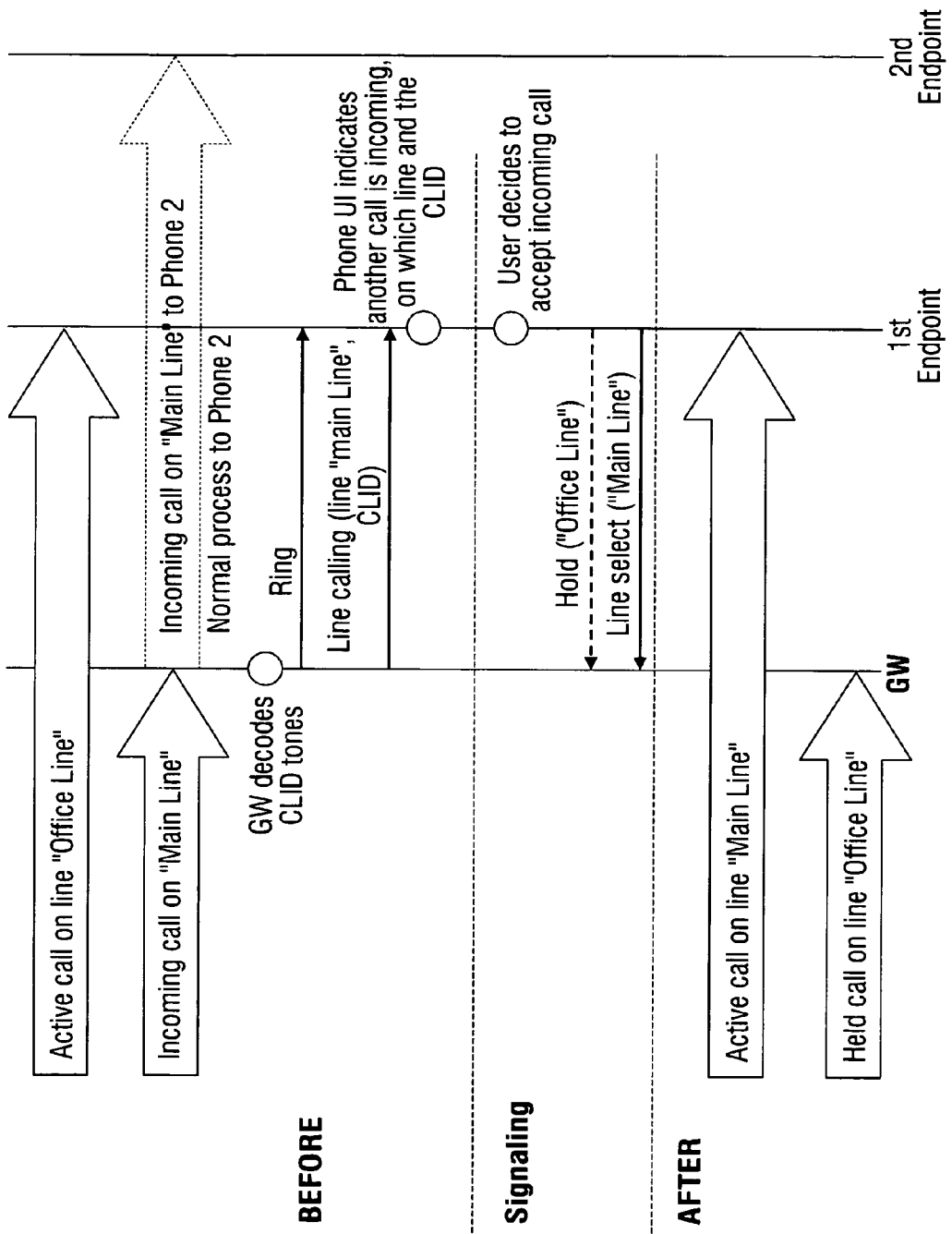
FIG. 13 is a diagram illustrating the operation of receiving a second call when a call is already active.

FIG. 13 is a diagram illustrating the operation of receiving a second call when a call is already active. A legacy multiline phone indicates when a call is coming in on a second external telephone line, even if there is already an active call on a first external telephone line. The legacy system can do this because all lines physically terminate at the legacy system and the phone can readily detect the ringing status of such lines. In the present invention multiline telephone system, only one audio path (channel) can exist between the GW and each endpoint. Therefore, the presence of a second call must be communicated using out-of-band control channel signals. As shown, a call is active on the "Office line" when a second incoming call is received at the gateway on a second external telephone line ("Main line" in the figure). The GW is mapped to ring calls received on this line to two internal endpoints. The set-up and ringing process occurs normally to the second endpoint, which does not have an active call (an audio path is established so that CLID information can be passed in-band if desired). However, no audio path to the first endpoint can be established to carry CLID in-band information at this time, because there is already one active stream for another call and the virtual multiline endpoint cannot support more than one audio stream to each endpoint. Therefore, the GW must terminate the audio and decode necessary CLID (caller ID) information for the first endpoint. Once the CLID information has been decoded and the CLID is known, the GW will send an out-of-band "line calling" message to the first endpoint. This message, possibly in conjunction with the ring message indicates that another line is ringing ("main line" in the figure) and provides the CLID of the caller. A user at the first endpoint sees some indication on their UI that another incoming call is trying to be completed (e.g. a flashing LED, indication on the LCD, beep in the earpiece etc). In some aspects, the endpoints can display the CLID information on an LCD to help the user decide whether to answer the new call.

If the user decides to answer the new call, they can either select the new line, causing line switching similar to that described above, or answer the second call by pressing some other key. This causes the endpoint to send the hold and line select messages to the GW, which places the previously active call on hold and connects the new call.

Note that although the ring messages which are used to toggle a phone's ringer on/off can be sent, the endpoint need not actually audibly ring to avoid interrupting the existing call. Instead, the endpoint can use the on/off toggling of the out-of-band ring message as a guide that the caller has not given up. If the caller gives up attempting to connect, the ring messages will cease and the endpoint uses the UI to display that there is no longer a call being attempted. This process can be implemented using a simple timer in the endpoint to determine if the "ringing" has stopped. Alternatively, the GW can send a separate out-of-band message to indicate that the call attempt has stopped, and this is appropriately indicated by the endpoint's UI.

A conventional multiline phone can place a first line on hold and dial a second call. The same operation can be enabled in the present invention system using the same hold and stream switching mechanisms described at length above. For example, a user places the first line on hold and then selects another external telephone line for the new call, and dials. The user can then switch between the new active call and the held call in the manner(s) previously described.

In another example, a user has an active call on one external telephone line and selects another external telephone line that does not yet have a call without explicitly placing the original call on hold. After receiving a dial tone on the new line, the new call can be made. The original call could either be placed on hold, or alternatively, dropped as a result of this action. Again, the user can switch between the new active call and the call on hold. In some aspects, the user may set their endpoint set in auto select mode. In some aspects of this mode, when the user places an existing call on hold, this action causes the GW to connect the audio of the endpoint to the next available idle external telephone line. A dial tone is automatically obtained without having to manually select a new line. Again, the user can switch between the active and held call.

Figure 14:
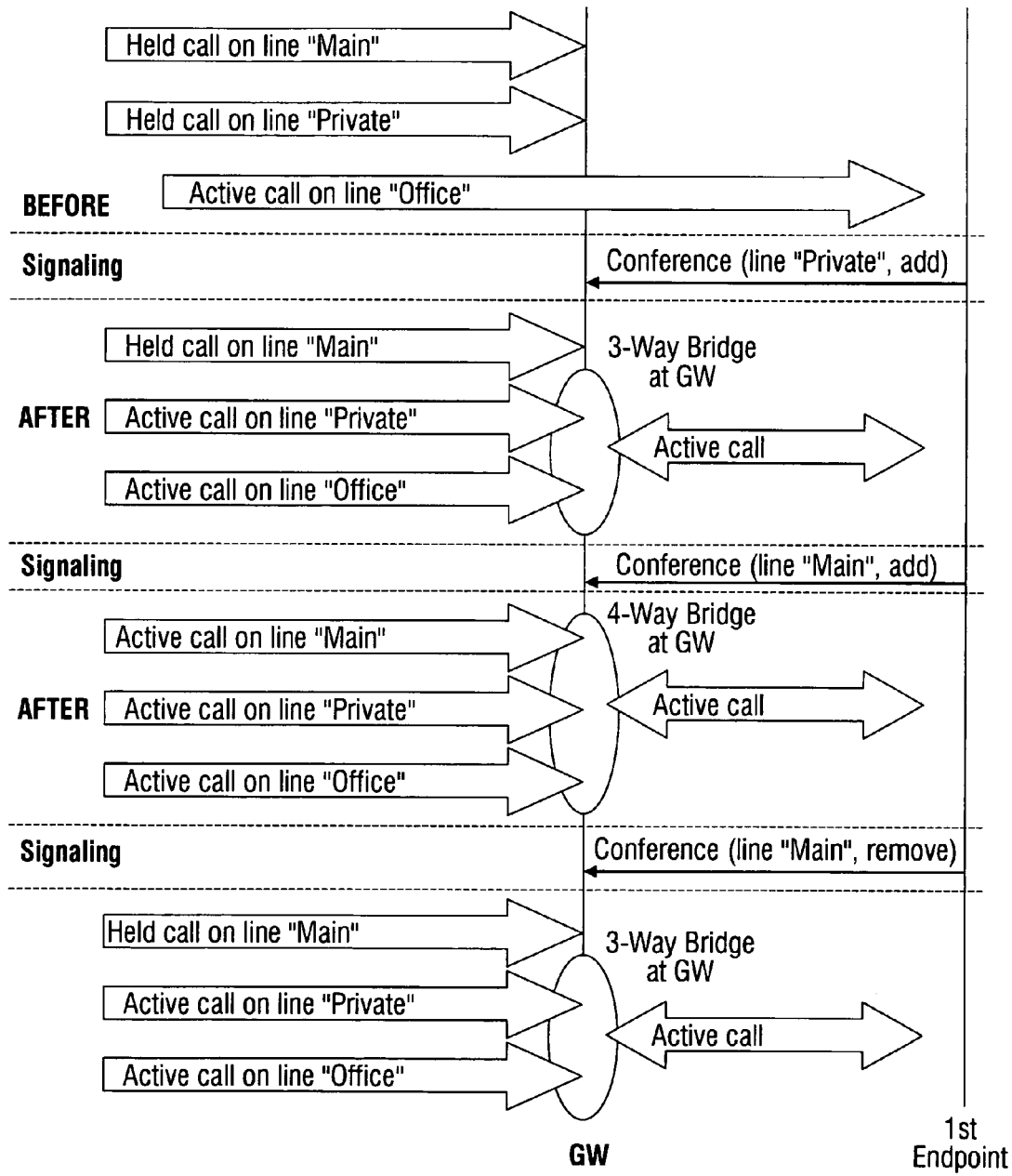
FIG. 14 is a diagram illustrating the operation of the conferencing signals.

FIG. 14 is a diagram illustrating the operation of the conferencing signals. A typical legacy multiline phone is able to bridge more than one call on its different external telephone lines to create a multi-party call that involves three or more callers. The present invention system supports the same function using out-of-band signaling to control call bridging at the GW. As shown, the situation starts with one call active and two calls held at the GW. The user desires to add the party held on the "Private" line to the conference, so they select this option on the UI of their endpoint. This action results in an out-of-band message "conference" being sent, indicating that the held party on line "Private" should be added to the call. The GW then establishes a three-way conference bridge involving the endpoint, plus the two external lines. Further, a second endpoint (not shown) could also be conferenced into a call with the first endpoint.

Subsequently, the user decides to add the fourth caller to the call, who is currently held on the line "Main". This is done in the same manner.

Finally, the figure illustrates the mechanism for a party to be removed from the conference. Here, for example, the user of the first endpoint decides to remove the caller on line "Main" and selects this option from his endpoint UI. This action results in the out-of-band message "conference" being sent indicating that this caller should be removed, and the multi-stream bridge drops back to a three-party call. Although the example of FIG. 14 illustrates the case where the call on line "main" remains on hold at the gateway, it is also possible fro the call on line "Main" to be dropped. It is also possible for a party to leave the call by hanging up. In this case, the on-hook or call termination received at the GW results in only the user who left the call from being dropped from the bridged call.

It should be noted that there is no restriction on the conferencing process with regard to internal and external lines. For example, it is possible for a four-way conference bridge to be made between three external lines and one internal endpoints or two external lines and two internal endpoints or one external line and three internal endpoints.

Typically, the GW stores two key pieces of configuration information for the telephony service: the mapping of incoming calls to VoHN extensions; and, the selection sequence for outgoing calls if auto select is used. Conventionally these functions are configured in the gateway using an I/O device (PC) that is connected to the GW inside the home, either directly or via the home-network. However, it is desirable to support viewing and configuration of these parameters from the endpoint itself, especially if the endpoint supports an LCD that can readily display the status. The above-described sentry function can be used to guard access to this configuration information.

Figure 15:
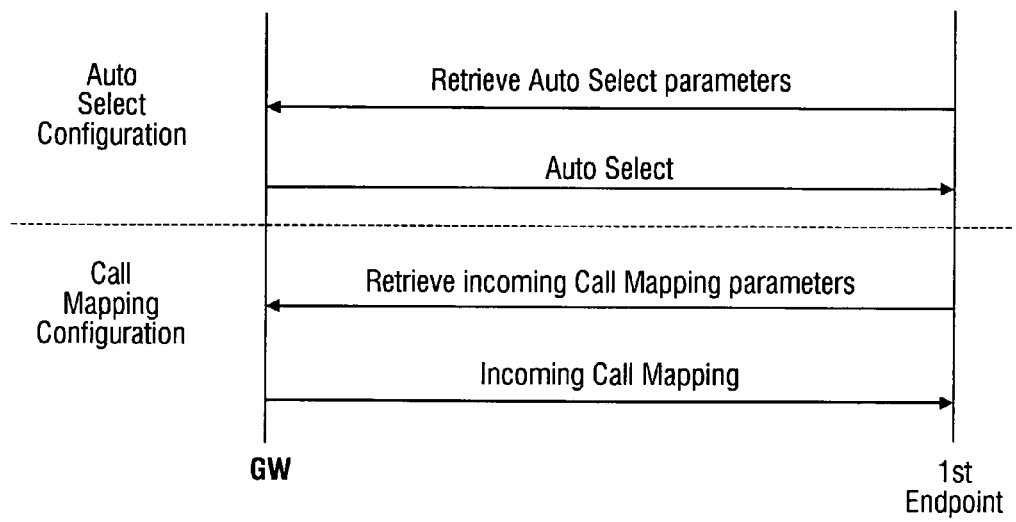
FIG. 15 is a diagram illustrating the operation of an endpoint retrieving current configuration information from the gateway.

FIG. 15 is a diagram illustrating the operation of an endpoint retrieving current configuration information from the gateway. As shown, the user wants to see the auto select parameters of the endpoint, so this option is selected. A request is sent to the GW, which responds with the configuration parameters. The response shows the current priority order in which outgoing external telephone lines are selected for use with this endpoint. As described earlier, the auto select parameters can be different for each endpoint. Alternately, a global auto select sequence can be used for all the endpoints. Similar messaging is used to edit the auto select parameters.

The user can also request the incoming call mapping parameters. That is, the external telephone lines that will cause the endpoint to ring. The following is an exemplary list of all possible external telephone lines connected in the system:

1: "Office line"
2: "Private line"
3: "Main line"

To see the incoming call mapping, the user selects this option from the UI on his endpoint. This results in the message being sent to the GW requesting this information, which is then returned to the endpoint. The answer from the GW, "incoming call mapping" will list all available telephone lines and whether or not they are mapped to the requesting endpoint. For example:

"Office line": YES
"Private line": NO
"Main line": YES

This example indicates that incoming calls on the "Office line" and "Main line" will ring the first endpoint, while incoming calls on "Private line" will not.

Figure 16:
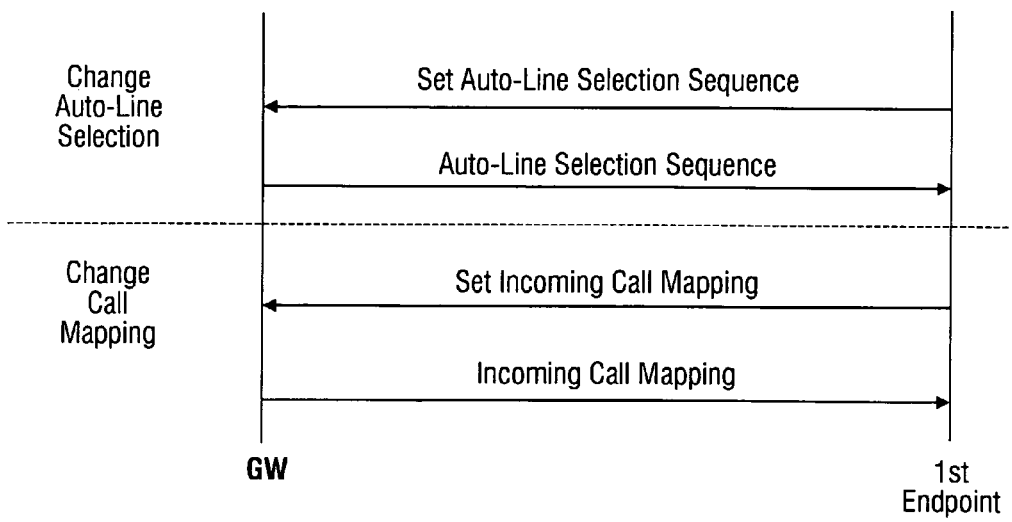
FIG. 16 is a diagram illustrating the operation of the call mapping signals.

FIG. 16 is a diagram illustrating the operation of the call mapping signals. If, after retrieving the configuration, the user would like to alter it, they can do so readily since the current configuration data is available. For example, the user could change the line selection order by swapping the priorities of "Office line" and "Private line". A message is sent from the endpoint to the GW "set automatic idle line selection sequence" which causes the GW to modify its configuration to match the request. Likewise, if the user desired to change the line mappings so that the "Office line" no longer rings the first endpoint, they can readily do so from the phone, causing a message to be sent to the GW changing the configuration. In some aspects, the sentry function described above can be used to guard access to the call mapping configuration data.

FIGS. 17a through 17l are flowcharts illustrating the present invention method for multiline telephony in a home-network telephone system. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1700. Step 1702 establishes a gateway. Step 1704 transceives calls on a plurality of external telephone lines. Calls are transceived on external telephone lines such as voice-over-broadband (VoBB) (as defined above), fax-over-broadband, plain old telephone service (POTS), and integrated services digital network (ISDN). Step 1706 bridges a call between at least one home-network endpoint and a selected external telephone line. That is, the endpoint can use out-of-band signaling to select among the external telephone lines (and even other endpoints), exhibiting a virtual multiline behavior. Calls are bridged to endpoints such as telephones, fax machines, modems, multifunction peripherals (MAPS), video-telephones, wireless communication devices, and hardwired communications devices.

In some aspects of the method, transceiving calls on a plurality of external telephone lines in Step 1704 includes the gateway transceiving the calls. Bridging a call in Step 1706 includes using the gateway to communicate with each endpoint via an independent audio channel. Using the gateway to communicate with each endpoint via an independent audio channel includes using transmission media such as an Ethernet line, a telephone hardline, an AC powerline, dedicated hardline, coaxial cable, or a wireless communication channel.

In some aspects, transceiving calls on a plurality of external telephone lines in Step 1704 includes the gateway communicating call information in an external format. Then, bridging a call in Step 1706 includes substeps. In Step 1706a the gateway converts between the external format and a digital home-network format. Step 1706b establishes a traffic channel between the gateway and the endpoint to communicate information in the home-network format. Step 1706c establishes an out-of-band (control) channel to manage the corresponding traffic channel.

In one example, transceiving calls on a plurality of external telephone lines in Step 1704 includes transceiving calls on a first and second external telephone line. Then, bridging a call in Step 1706 includes bridging a call between a first endpoint and an external telephone line that is either the first or second external telephone line.

In some aspects of the method, bridging a call in Step 1706 includes bridging calls received via one of the plurality of external telephone lines, or calls, originated from the endpoint, that select one of the plurality of external telephone lines for the outgoing call. Alternately, Step 1706 bridges calls originated at an external line to an endpoint.

Figure 17A:
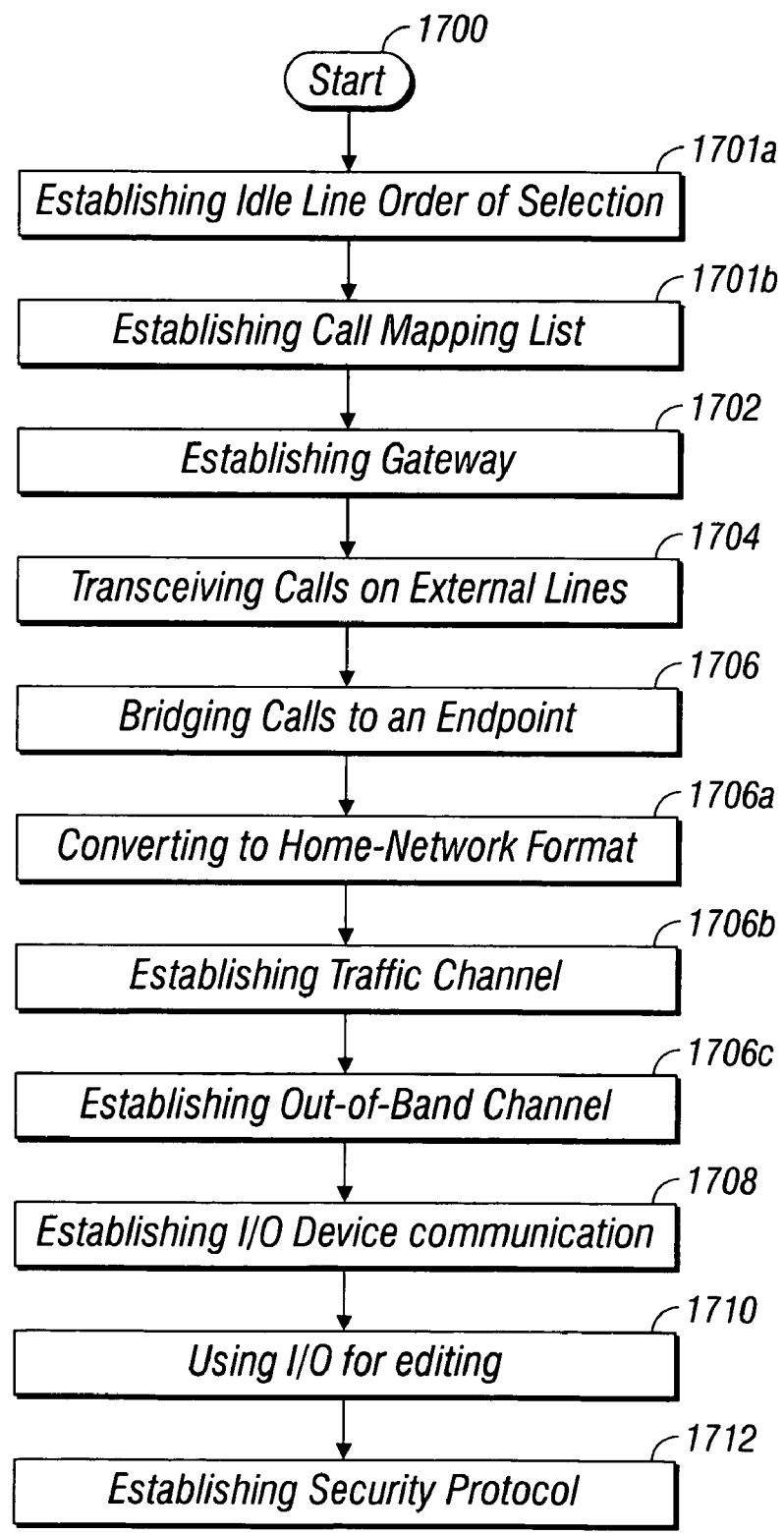
FIGS. 17a through 17l are flowcharts illustrating the present invention method for multiline telephony in a home-network telephone system.
Figure 17B:
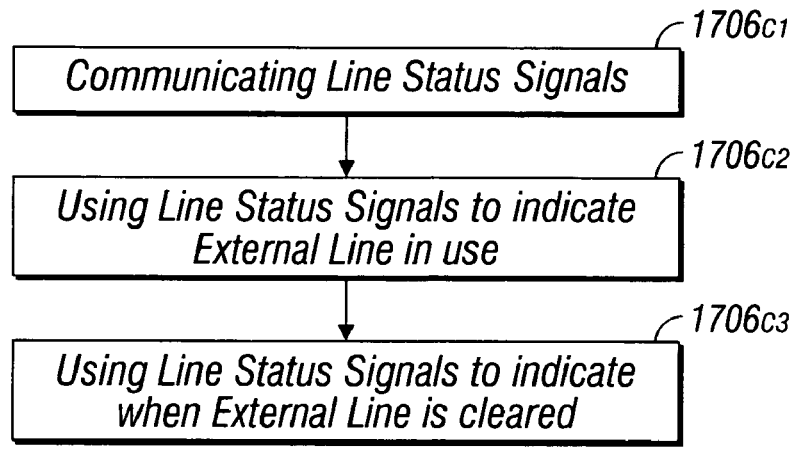

In some aspects, establishing an out-of-band channel to manage the corresponding traffic channel in Step 1706c includes substeps shown in FIG. 17b. Step 1706c1 communicates control channel line status signals from the gateway to each endpoint. Step 1706c2 uses the line status signal to indicate when an external telephone line is in use. Step 1706c3 uses the line status signal to indicate when the external telephone line is cleared.

Figure 17C:
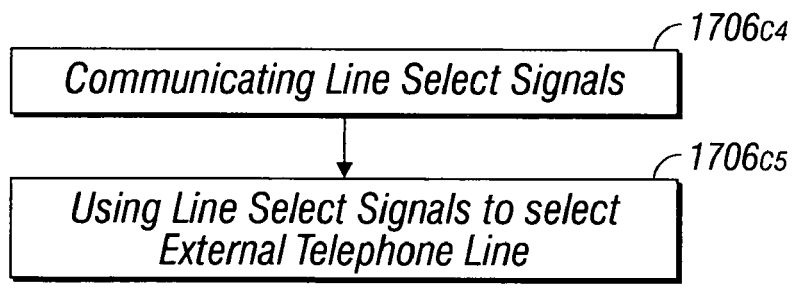

In other aspects, establishing an out-of-band channel to manage the corresponding traffic channel in Step 1706c includes alternate substeps shown in FIG. 17c. Step 1706c4 communicates control channel line select signals from endpoints to the gateway. Step 1706c5, from an endpoint, uses the line select signal to choose between the plurality of external telephone lines for an outgoing call.

Figure 17D:
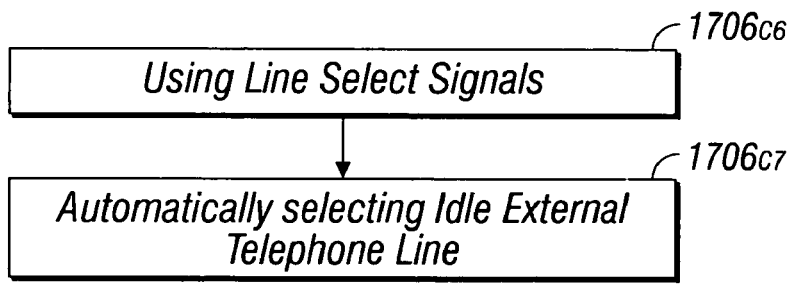

In some aspects, establishing an out-of-band channel to manage the corresponding traffic channel in Step 1706c includes alternate substeps shown in FIG. 17d. Step 1706c6 communicates control channel line select signals from endpoints to the gateway. Step 1706c7, from an endpoint, uses the line select signal to trigger an automatic selection of an idle external telephone line for an outgoing call.

Returning to FIG. 17a, some aspects of the method comprise a further step. Step 1701a establishes an idle external telephone line order of selection at the gateway. Then, establishing an out-of-band channel to manage the corresponding traffic channel in Step 1706c includes using auto select configuration signals to request a current configuration of the order of selection and/or to edit the idle external telephone line order of selection from an endpoint.

Figure 17E:
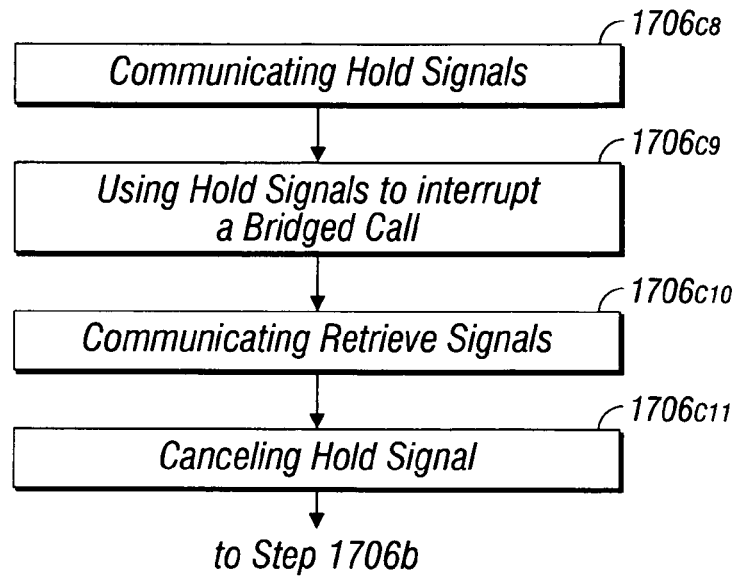

In other aspects, establishing an out-of-band channel to manage the corresponding traffic channel in Step 1706c includes alternate substeps shown in FIG. 17e. Step 1706c8 communicates control channel call hold signals from endpoints to the gateway. Step 1706c9 uses the hold signal to interrupt a call bridged between an external telephone line and a first endpoint. Typically, the call to the first endpoint is interrupted exclusively in response to a hold signal from the first endpoint to the gateway.

In some aspects, establishing an out-of-band channel to manage the corresponding traffic channel includes other substeps. Step 1706c10 communicates control channel retrieve signals from endpoints to the gateway. Step 1706c11, from a first endpoint, uses the retrieve signal to cancel the hold signal. Then, establishing a traffic channel between the gateway and the endpoint in Step 1706b includes establishing a traffic channel to the first endpoint in response to the retrieve signal. Typically, the call on hold can be retrieved by any endpoint, not only the endpoint that placed the call on hold.

Figure 17F:
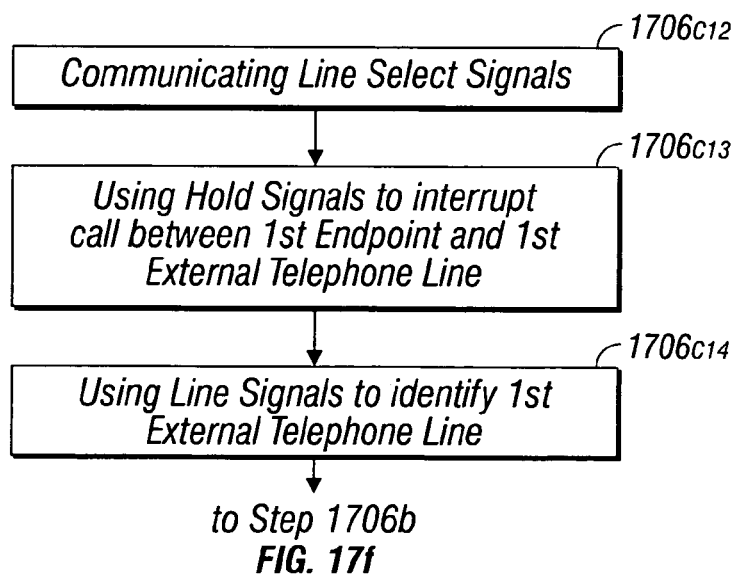

Establishing an out-of-band channel to manage the corresponding traffic channel can include other substeps shown in FIG. 17f. Step 1706c12 communicates control channel line select signals from endpoints to the gateway. Step 1706c13 uses the hold signal to interrupt a call bridged between a first endpoint and a first external telephone line. Step 1706c14 uses the line select signal from a second endpoint to identify the first external telephone line. Then, establishing a traffic channel between the gateway and the second endpoint to communicate information in the home-network format in Step 1706b includes establishing a traffic channel between the second endpoint and the first external telephone line in response to the line select signal.

Figure 17G:
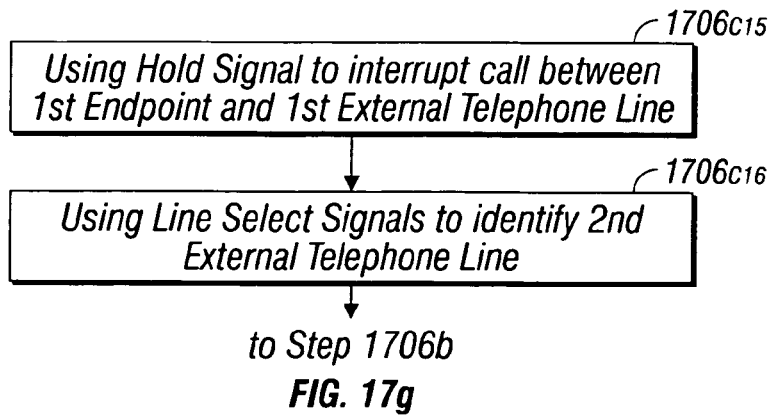

Establishing an out-of-band channel to manage the corresponding traffic channel can include alternate substeps, as shown in FIG. 17g. Step 1706c15 uses the hold signal to interrupt a call between a first endpoint and a first external telephone line. Step 1706c16 uses the line select signal to identify a second external telephone line. Then, establishing a traffic channel between the gateway and the endpoint in Step 1706b includes establishing a traffic channel between the first endpoint and the second external telephone line in response to the line select signal. In other aspects (not shown), with a call active on the first external line, Step 1706c16 uses the line select signal to select a second external line. The call associated with the first external line can either be put on hold or dropped.

Figure 17H:
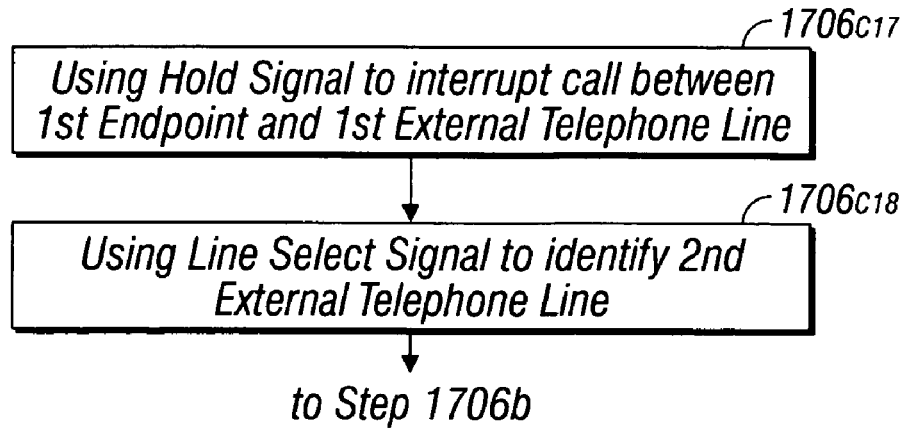

The process described in the previous paragraph can be performed to either answer a call on a second external line, or originate a new call on the second external line, as shown in FIG. 17h, using Steps 1706c17, 1706c18, and 1706b.

In some aspects of the method, using the hold signal to interrupt a call bridged between an external telephone line and a first endpoint in Step 1706c9 includes the gateway supplying a hold message to the external telephone line to which the call has been interrupted. In other aspects, a hold message, either music or a user-defined message is supplied.

Some aspects of the method include further steps. Step 1708 establishes an input/output (I/O) device in communication with the gateway. Step 1710 uses the input/output device to edit the hold messages stored in the gateway. Step 1712 optionally establishes a gateway access security protocol. Then, using the input/output device to edit the hold messages stored in the gateway in Step 1710 includes accessing the gateway in response to passing the gateway access security protocol. The I/O device can also be used to access and edit auto select order of selection configurations and the call mapping configurations in some aspects of the invention.

Figure 17I:
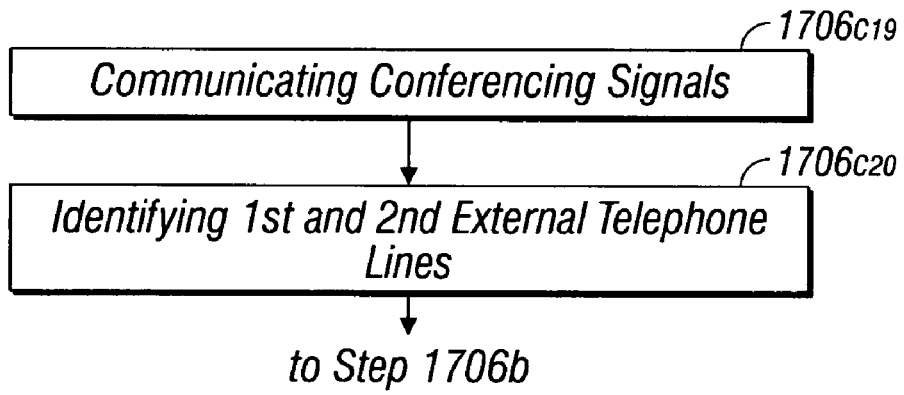

In some aspects, establishing an out-of-band channel to manage the corresponding traffic channel includes other substeps shown in FIG. 17i. Step 1706c19 communicates control channel conference signals between endpoints and the gateway. Step 1706c20, from a first endpoint, uses conference signals to identify a first external telephone line and a second external telephone line. Then, establishing a traffic channel between the gateway and the endpoint to communicate information in the home-network format in Step 1706b includes establishing a traffic channel between the first endpoint, the first external telephone line, and the second external telephone line in response to the conference signals. The conference bridge bridges the call so that the speech of every participant is heard by all the other participants in the conference call.

In some aspects, transceiving calls on a plurality of external telephone lines in Step 1704 includes receiving calling line ID (CLID) tones to identify an incoming call calling party. The gateway converting between the format and a digital home-network format in Step 1706a includes the gateway converting the calling line ID tones to caller ID information in a digital format. Then, establishing a control channel to manage the corresponding traffic channel in Step 1706c includes using the control channel to communicate the digital format caller ID information to endpoints from the gateway. Since this CLID information is sent in an out-of-band control message, it is possible for an endpoint to receive the CLID information of an incoming call on a second external line, while the endpoint is in a state where a call is active on a first external line.

Figure 17J:
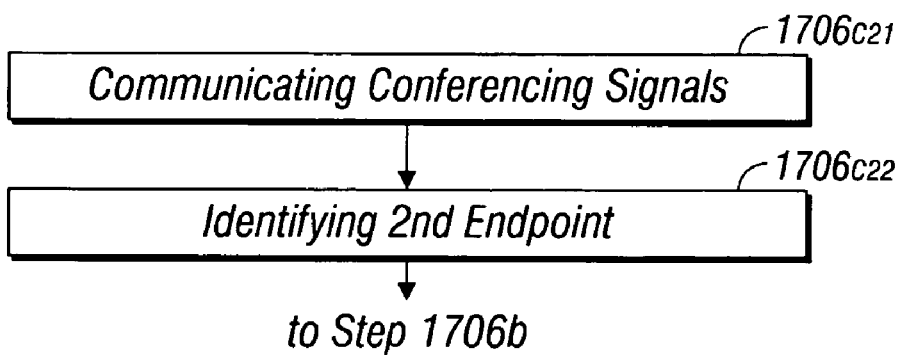

In some aspects, establishing a control channel to manage the corresponding traffic channel in Step 1706c includes substeps shown in FIG. 17j. Step 1706c21 communicates control channel conference signals between endpoints and the gateway. Step 1706c22, from a first endpoint, uses conference signals to identify a second endpoint. Then, establishing a traffic channel between the gateway and the endpoint in Step 1706b includes establishing a traffic channel between the first endpoint, an external telephone line, and the second endpoint in response to the conference signals. The conference bridge bridges the call so that the speech of every participant is heard by all the other participants in the conference call.

Figure 17K:
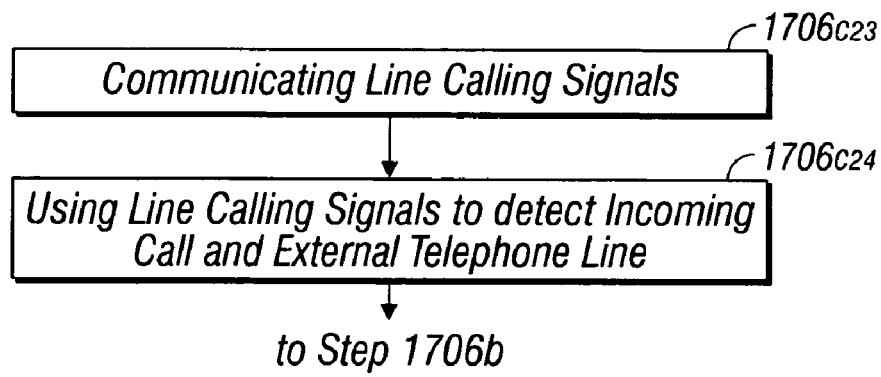

Establishing an out-of-band channel to manage the corresponding traffic channel alternately includes other substeps shown in FIG. 17k. Step 1706c23 communicates control channel line calling signals from the gateway to the endpoints. Step 1706c24, from a first endpoint, uses the line calling signals to detect an incoming call, and the external telephone line on which the incoming call is transceived.

Figure 17L:
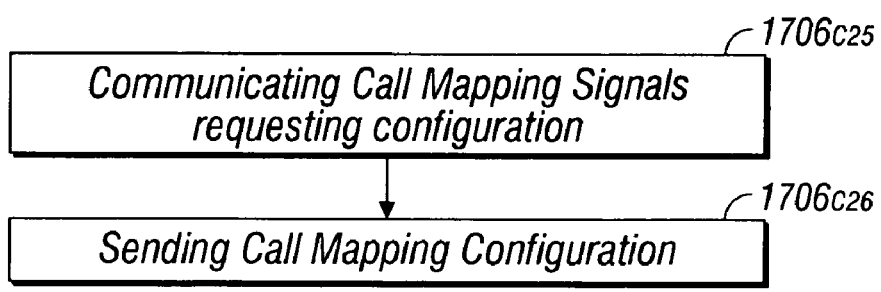

Some aspects of the method include a further step. Step 1701b establishing a call mapping list of external telephone lines cross-referenced to endpoints. Then, establishing a control channel to manage the corresponding traffic channel in Step 1706c includes communicating control channel line calling signals to notify endpoints of incoming calls in response to the call mapping list. Additional substeps are shown in FIG. 17l. Step 1706c25 communicates control channel call mapping signals to the gateway from a first endpoint requesting the call mapping configuration. Step 1706c26 communicates control channel call mapping signals to the first endpoint from the gateway sending the call mapping configuration. In some aspects, establishing a control channel to manage the corresponding traffic channel includes communicating control channel call mapping signals from the first endpoint to the gateway for editing the call mapping configuration. A sentry feature can be used to guard access to the configuration information. Similar procedures can also be used to retrieve and edit auto call selection order. Again, this configuration information can be guarded with a sentry feature.

A system and method for multiline telephone in a home-network telephone system have been provided. At its core, the invention uses out-of-band signaling from a single-line VoHN endpoint to control bridging and switching of multiple lines at a broadband gateway, in order to mimic multiline behavior. Specific messaging formats have been presented as a way of explaining the invention. However, one skilled in the art could manage these same function by combining the exemplary messages, or by using alternate messaging formats. Alternate embodiments of the invention can bridge calls inside the system, such as a call between endpoints. The mechanisms described above can be used to facilitate such an embodiment. Other variations and embodiments of the invention will occur to those skilled in the art.

I claim:

1. In a home-network telephone system, a method for multiline telephony, the method comprising:
   establishing a gateway;
   the gateway transceiving calls on a plurality of external telephone lines, communicating call information in an external format; and,
   bridging a call between at least one home-network endpoint and a selected external telephone line by using the gateway to communicate with each endpoint via an independent audio channel as follows:
      the gateway converting between the external format and a digital home-network format;
      establishing a traffic channel between the gateway and the endpoint to communicate information in the home-network format; and,
      establishing an out-of-band channel to manage the corresponding traffic channel and gateway bridging functions.

2. The method of claim 1 wherein transceiving calls on a plurality of external telephone lines includes transceiving calls on external telephone lines selected from the group including voice-over-broadband (VoBB), voice over DSL (VoDSL), voice over Ethernet, voice over ATM (VoATM), voice over Internet Protocol (VoIP), fax-over-broadband, plain old telephone service (POTS), and integrated services digital network (ISDN).

3. The method of claim 1 wherein bridging a call includes bridging the call to an endpoint selected from the group including telephones, fax machines, modems, multi-function peripherals (MFPs), video-telephones, wireless communication devices, and hardwired communications devices.

4. The method of claim 1 wherein transceiving calls on a plurality of external telephone lines includes transceiving calls on a first and second external telephone line; and,
   wherein bridging a call includes bridging a call between a first endpoint and an external telephone line selected from the group including the first and second external telephone lines.

5. The method of claim 4 wherein bridging a call includes bridging calls selected from the group including calls received via one of the plurality of external telephone lines and calls, originated from the endpoint, selecting one of the plurality of external telephone lines for the outgoing call.

6. The method of claim 5 wherein establishing an out-of-band channel to manage the corresponding traffic channel includes:
   communicating control channel line status signals from the gateway to each endpoint;
   using the line status signal to indicate when an external telephone line is in use; and,
   using the line status signal to indicate the external telephone line is cleared.

7. The method of claim 5 wherein establishing an out-of-band channel to manage the corresponding traffic channel includes:
   communicating control channel line select signals from endpoints to the gateway; and,
   from an endpoint, using the line select signal to choose between the plurality of external telephone lines for an outgoing call.

8. The method of claim 5 wherein establishing an out-of-band channel to manage the corresponding traffic channel includes:
   establishing control channel line select signals from endpoints to the gateway; and,
   from an endpoint, using the line select signal to trigger an automatic selection of an idle external telephone line for an outgoing call.

9. The method of claim 8 further comprising;
   establishing an idle external telephone line order of selection at the gateway; and,
   wherein establishing an out-of-band channel to manage the corresponding traffic channel includes using line select auto select parameter signals to request the order of selection configuration and to edit the idle external telephone line order of selection from an endpoint.

10. The method of claim 5 wherein establishing an out-of-band channel to manage the corresponding traffic channel includes:
communicating control channel call hold signals from endpoints to the gateway; and,
using the hold signal to interrupt a call bridged between an external telephone line and a first endpoint, creating a hold state.

11. The method of claim 10 wherein using the hold signal to interrupt a call bridged between an external telephone line and a first endpoint includes interrupting a call to the first endpoint exclusively in response to a hold signal from the first endpoint to the gateway.

12. The method of claim 10 wherein establishing an out-of-band channel to manage the corresponding traffic channel includes:
communicating control channel retrieve signals from endpoints to the gateway;
from a first endpoint, using the retrieve signal to cancel the hold state; and,
wherein establishing a traffic channel between the gateway and the endpoint to communicate information in the home-network format includes establishing a traffic channel to the first endpoint and bridging the first endpoint to the previously held external call in response to the retrieve signal.

13. The method of claim 10 wherein establishing an out-of-band channel to manage the corresponding traffic channel includes:
using the hold signal to interrupt a call bridged between a first endpoint and a first external telephone line; and,
communicating control channel line select signals from endpoints to the gateway;
using the line select signal to identify the first external telephone line; and,
wherein establishing a traffic channel between the gateway and the endpoint to communicate information in the home-network format includes establishing a traffic channel between the first external telephone line and one of a plurality of endpoints, in response to the line select signal.

14. The method of claim 10 wherein establishing an out-of-band channel to manage the corresponding traffic channel includes;
using the hold signal to interrupt a call between a first endpoint and a first external telephone line; and,
using the line select signal to identify a second external telephone line; and,
wherein establishing a traffic channel between the gateway and the endpoint to communicate information in the home-network format includes establishing a traffic channel between the first endpoint and the second external telephone line in response to the line select signal.

15. The method of claim 14 wherein establishing a traffic channel between the gateway and the endpoint to communicate information in the home-network format includes:
dropping the interrupted call; and,
establishing a traffic channel to originate a call from the first endpoint on the second external telephone line in response to the line select signal.

16. The method of claim 14 wherein establishing a traffic channel between the gateway and the endpoint to communicate information in the home-network format includes:
holding the interrupted call; and,
establishing a traffic channel to originate a call from the first endpoint on the second external telephone line in response to the line select signal.

17. The method of claim 10 wherein using the hold signal to interrupt a call bridged between an external telephone line and a first endpoint includes the gateway supplying a hold message to the external telephone line to which the call has been interrupted.

18. The method of claim 17 wherein supplying a hold message to the external telephone line to which the call has been interrupted includes supplying a hold message selected from the group including music and user-defined messages.

19. The method of claim 5 further comprising:
establishing an input/output (I/O) device in communication with the gateway; and,
using the input/output device to perform a review function selected from the list including reviewing and editing hold messages stored in the gateway, reviewing and editing the call select list stored in the gateway, and reviewing and editing the call mapping list stored in the gateway.

20. The method of claim 19 further comprising:
establishing a gateway access security protocol; and,
wherein using the input/output device to edit a review function includes accessing the gateway in response to passing the gateway access security protocol.

21. The method of claim 1 wherein establishing an out-of-band channel to manage the corresponding traffic channel includes:
communicating control channel conference signals between endpoints and the gateway;
from a first endpoint, using conference signals to identify a first external telephone line and a second external telephone line; and,
wherein establishing a traffic channel between the gateway and the endpoint to communicate information in the home-network format includes establishing a traffic channel between the first endpoint, the first external telephone line, and the second external telephone line in response to the conference signals.

22. The method of claim 5 wherein transceiving calls on a plurality of external telephone lines includes receiving external format calling line ID (CLID) information to identify an incoming call calling party;
wherein the gateway converting between the external format and a digital home-network format includes the gateway converting the external format calling line ID information to caller ID information in a digital home-network format; and,
wherein establishing an out-of-band channel to manage the corresponding traffic channel includes using the out-of-band channel to communicate the digital format caller ID information to endpoints from the gateway.

23. The method of claim 5 wherein establishing a traffic channel between the gateway and the endpoint to communicate information in the home-network format includes establishing a traffic channel between a first endpoint and a first external telephone line;
wherein establishing an out-of band channel to manage the corresponding traffic channel includes, from the first endpoint, using conference signals to identify a party on hold selected from the group including endpoints and external telephone lines; and,
wherein establishing a traffic channel includes establishing a traffic channel to the selected party and creating a conference call between conference call parties including the first endpoint, the first external line, and the selected party.

24. The method of claim 23 wherein establishing an out-of-band channel to manage the corresponding traffic channel includes:
   from the first endpoint, using conference signals to identify a conference call party to be removed from the conference call; and,
   breaking down the traffic channel between the party to be removed and the gateway.

25. The method of claim 5 wherein establishing an out-of-hand channel to manage the corresponding traffic channel includes:
   communicating control channel line calling signals from the gateway to the endpoints; and,
   from a first endpoint, using the line calling signals to detect an incoming call, and the external telephone line on which the incoming call is transceived.

26. The method of claim 25 further comprising:
   establishing a call mapping list of external telephone lines cross-referenced to endpoints; and,
   wherein establishing a control channel to manage the corresponding traffic channel includes communicating control channel line calling signals to notify endpoints of incoming calls in response to the call mapping list.

27. The method of claim 26 wherein establishing a control channel to manage the corresponding traffic channel includes:
   communicating control channel call mapping signals to the gateway from a first endpoint requesting the call mapping configuration; and,
   communicating control channel call mapping signals to the first endpoint from the gateway sending the call mapping configuration.

28. The method of claim 27 wherein establishing a control channel to manage the corresponding traffic channel includes communicating control channel call mapping signals from the first endpoint to the gateway for editing the call mapping configuration.

29. The method of claim 1 wherein using the gateway to communicate with each endpoint via a common channel includes using a channel selected from the group including an Ethernet line, a telephone hardline, an AC powerline, coaxial cable, dedicated hardlines, and a wireless communication channel.

30. A multiline telephony home-network telephone system comprising:
   at least one home-network endpoint, each endpoint having a port to receive calls via an independent audio channel;
   a transmission media connected to the port of each endpoint; and,
   a gateway having a port for transceiving calls on a plurality of external telephone lines in an external format and a port connected to the transmission media for bridging a call on one of the external telephone lines by converting between the external format and a digital home-network format, establishing a traffic channel between the gateway and the endpoint to communicate information in the home-network format, and establishing an out-of band channel to manage the corresponding traffic channel.

31. The system of claim 30 wherein the gateway transceives calls on external telephone lines selected from the group including voice-over-broadband (VoBB), voice over DSL (VoDSL), voice over Ethernet, voice over ATM (VoATM), voice over Internet Protocol (VoIP), Lax-over-broadband, plain old telephone service (POTS), and integrated services digital network (ISDN).

32. The system of claim 30 wherein the endpoint is selected from the group including telephones, fax machines, modems, multi-function peripherals (MFPs), video-telephones, wireless communication devices, and hardwired communications devices.

33. The system of claim 30 wherein the gateway transceives calls on a first and second external telephone line and bridges a call between a first endpoint and an external telephone line selected from the group including the first and second external telephone lines.

34. The system of claim 33 wherein the gateway bridges calls selected from the group including calls received via one of the plurality of external telephone lines and calls, originated from the endpoint, selecting one of the plurality of external telephone lines for the outgoing call.

35. The system of claim 34 wherein the gateway communicates control channel line status signals to each endpoint; and,
   wherein each endpoint receives the line status signals to indicate when a call is bridged to an external telephone line, and to indicate when the bridge between the call and the external telephone line is cleared.

36. The system of claim 34 wherein the gateway receives control channel line select signals from endpoints;
   wherein a first endpoint uses the line select signal to choose between the plurality of external telephone lines for an outgoing call.

37. The system of claim 34 wherein the gateway receives control channel line select signals from the endpoints; and,
   wherein a first endpoint uses the line select signal to automatically select between a plurality of idle external telephone lines, for an outgoing call.

38. The system of claim 37 wherein the gateway includes a line select repository including an external telephone line order of selection for selecting an idle external telephone line; and,
   wherein the wherein the endpoints use control channel line select auto select parameter signals to request a current order of selection configuration and to edit the idle external telephone line order of selection in the line select repository.

39. The system of claim 34 wherein the gateway receives control channel call hold signals from the endpoints; and,
   wherein any of a plurality of endpoints, use the hold signal to interrupt a call bridged between an external telephone line and a first endpoint.

40. The system of claim 34 wherein the gateway receives control channel call hold signals from the endpoints; and,
   wherein an first endpoint uses the hold signal to exclusively interrupt a call bridged between an external telephone line and the first endpoint.

41. The system of claim 39 wherein the gateway receives control channel retrieve signals from the endpoints;
   wherein a first endpoint uses the retrieve signal to cancel the hold signal; and,
   wherein the gateway establishes a traffic channel between the first endpoint and the interrupted external line, in response to the retrieve signal.

42. The system of claim 39 wherein the gateway receives control channel line select signals from the endpoints;
   wherein a first endpoint uses the hold signal to interrupt a call bridged between the first endpoint and a first external telephone line;

wherein the first endpoint using the line select signal to identify the first eternal telephone line; and, wherein the gateway establishes a traffic channel between the first endpoint and the first external telephone line in response to the line select signal.

43. The system of claim 39 wherein the first endpoint uses the hold signal to interrupt a call between a first endpoint and a first external telephone line;

wherein the first endpoint uses the line select signal to identify a second external telephone line; and, wherein the gateway establishes a traffic channel between the first endpoint and the second external telephone line in response to the line select signal.

44. The method of claim 39 wherein the first endpoint uses the hold signal to interrupt a call between a first endpoint and a first external telephone line; and, wherein the first endpoint uses the line select signal to identify a second external telephone line; and, wherein the gateway establishes a traffic channel to originate a call from the first endpoint on the second external telephone line in response to the line select signal.

45. The method of claim 39 wherein the first endpoint uses the hold signal to interrupt a call between a first endpoint and a first external telephone line; and, wherein the first endpoint uses the line select signal to identify a party selected from the group including an incoming call on a second external telephone line and a call on hold on the second external line; and, wherein the gateway drops the interrupted call and establishes a traffic channel between the first endpoint and the second external telephone line in response to the line select signal.

46. The method of claim 39 wherein the first endpoint uses the hold signal to interrupt a call between a first endpoint and a first external telephone line; and, wherein the first endpoint uses the line select signal to identify a party selected from the group including an incoming call on a second external telephone line and a call on hold on the second external line; and, wherein the gateway puts the interrupted call on hold and establishes a traffic channel between the first endpoint and the second external telephone line in response to the line select signal.

47. The system of claim 39 wherein the gateway includes a message repository to store hold messages that are supplied to the external telephone line to which the call has been interrupted.

48. The system of claim 39 wherein the gateway message repository supplies a hold message selected from the group including music and user-defined messages.

49. The system of claim 48 further comprising:

an input/output (I/O) device having a port in communication with the gateway message repository for editing the stored bold messages.

50. The system of claim 49 wherein the gateway includes a sentry circuit to control access to the gateway message repository; and, wherein the input/output device must pass sentry circuit security protocols to edit the hold messages.

51. The system of claim 34 wherein the gateway sends control channel line calling signals to the endpoints;

wherein a first endpoint uses the line calling signals to be notified of an incoming call, and the external telephone line on which the incoming call is transceived.

52. The system of claim 51 wherein the gateway includes a call mapping repository with a list of external telephone lines cross-referenced to endpoints that are notified, using line calling signals, in response to incoming calls.

53. The system of claim 52 wherein a first endpoint communicates control channel call mapping signals to the gateway requesting the call mapping repository configuration; and, wherein the gateway uses control channel call mapping signals to send the call mapping repository information to the first endpoint.

54. The system of claim 52 wherein the first endpoint uses control channel call mapping signals to the gateway for editing the call mapping repository cross-referenced listings.

55. The system of claim 34 wherein the gateway communicates control channel conference signals with the endpoints;

wherein a first endpoint uses conference signals to identify a first external telephone line and a second external telephone line; and, wherein the gateway establishes a traffic channel between the first endpoint, the first external telephone line, and the second external telephone line in response to the conference signals.

56. The system of claim 34 wherein the gateway receives calling line ID (CLID) information on the external telephone lines to identify an incoming call calling party, converts the calling line ID information to caller ID information in a digital home-network format, and uses the control channel to communicate the digital home-network format caller ID information to the endpoints.

57. The system of claim 34 wherein the gateway communicates control channel conference signals with the endpoint;

wherein a first endpoint, uses conference signals to identify a second endpoint; and, wherein the gateway establishes a traffic channel between the first endpoint, an external telephone line, and the second endpoint in response to the conference signals.

58. The system of claim 31 wherein the transmission media is selected from the group including an Ethernet line, a telephone hardline, coaxial cable, an AC powerline, dedicated hardlines, and a wireless communication channel.

* * * * *